(12) United States Patent
Ishii

(10) Patent No.: US 11,409,656 B2
(45) Date of Patent: Aug. 9, 2022

(54) SEMICONDUCTOR DEVICE

(71) Applicant: FUJITSU LIMITED, Kawasaki (JP)

(72) Inventor: Hiroyuki Ishii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/223,175

(22) Filed: Apr. 6, 2021

(65) Prior Publication Data
US 2022/0012175 A1 Jan. 13, 2022

(30) Foreign Application Priority Data
Jul. 9, 2020 (JP) .............................. JP2020-118410

(51) Int. Cl.
*G06F 12/08* (2016.01)
*G06F 12/0806* (2016.01)

(52) U.S. Cl.
CPC ...... *G06F 12/0806* (2013.01); *G06F 2212/60* (2013.01)

(58) Field of Classification Search
CPC .................................................. G06F 12/0806
See application file for complete search history.

(56) References Cited

U.S. PATENT DOCUMENTS

| 6,385,703 B1* | 5/2002 | Khandekar | G06F 12/0831 711/146 |
| 2007/0124552 A1* | 5/2007 | Chen | G06F 11/1441 711/162 |

FOREIGN PATENT DOCUMENTS

| JP | 62-203252 A | 9/1987 |
| JP | 4-92938 A | 3/1992 |

* cited by examiner

*Primary Examiner* — Jae U Yu
(74) *Attorney, Agent, or Firm* — WHDA, LLP

(57) ABSTRACT

A semiconductor device includes a core which includes a first cache and a second cache; and a third cache configured to connect to the core, wherein the core is configured to: hold a read instruction that is issued from the first cache to the second cache, hold a write-back instruction that is issued from the first cache to the second cache, process the read instruction and the write-back instruction, determine whether a target address of the read instruction is held by the first cache by using a cache tag that indicates a state of the first cache, and when data of the target address is held by the first cache, abort the read instruction until it is determined that data of the target address is not held by the first cache.

8 Claims, 15 Drawing Sheets ately into caches, and a store-through method for storing data into caches and the main memory. Further, a cache system in which a copyback method and a store-through method are mixed is known. For example, Japanese Laid-open Patent Publication No. 62-203252, Japanese Laid-open Patent Publication No. 4-92938, and the like are disclosed as related art.

SEMICONDUCTOR DEVICE

CROSS-REFERENCE TO RELATED APPLICATION

This application is based upon and claims the benefit of priority of the prior Japanese Patent Application No. 2020-118410, filed on Jul. 9, 2020, the entire contents of which are incorporated herein by reference.

FIELD

The embodiments discussed herein are related to semiconductor devices.

BACKGROUND

In a multiprocessor system including a plurality of processors, control is performed to maintain coherency between the data held by caches mounted in the respective processors and the data held by the main memory. Also, as a method for storing data from processors into the main memory, there are a copyback method for storing data temporarily into caches, and a store-through method for storing data into caches and the main memory. Further, a cache system in which a copyback method and a store-through method are mixed is known. For example, Japanese Laid-open Patent Publication No. 62-203252, Japanese Laid-open Patent Publication No. 4-92938, and the like are disclosed as related art.

SUMMARY

According to an aspect of the embodiments, a semiconductor device includes a core which includes a first cache and a second cache; and a third cache configured to connect to the core, wherein the core is configured to: hold a read instruction that is issued from the first cache to the second cache, hold a write-back instruction that is issued from the first cache to the second cache, process the read instruction and the write-back instruction, determine whether a target address of the read instruction is held by the first cache by using a cache tag that indicates a state of the first cache, and when data of the target address is held by the first cache, abort the read instruction until it is determined that data of the target address is not held by the first cache.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Processors such as central processing units (CPUs) these days have a plurality of layers of caches to improve performance. For example, a higher-level cache (L2) that receives an access request from a core issues a read request to a lower-side cache, in a case where a cache miss occurs. The lower-level cache (L1) issues a replacement request to the higher-level cache (L2) and outputs the target data of the read request to the higher-level cache (L2), to cause the higher-level cache (L2) to secure a cache line for storing the target data of the read request.

For example, the higher-level cache (L2) has a replacement buffer for evicting the data to be replaced beforehand at the time of issuance of the read request. The higher-level cache (L2) then invalidates a cache line in advance by evicting the replacement target data from the cache line into the replacement buffer, and secures a cache line for storing the target data of the read request. The higher-level cache (L2) outputs the replacement target data held in the replacement buffer to the lower-level cache (L1), on the basis of the replacement request from the lower-level cache (L1).

In a case where the higher-level cache (L2) of a processor having a plurality of layers of caches has a replacement buffer, the circuit size becomes larger by the amount equivalent to the replacement buffer. For example, in a case where a processor includes a plurality of cores each having a cache, and a last level cache (LLC) shared by the plurality of cores, a replacement buffer is provided in each of the caches in the plurality of cores, so that the influence of the processor on the chip size is great.

In view of the above, embodiments desirably achieve a data replacement function, without a replacement buffer provided between the higher cache and the lower cache.

Figure 1:
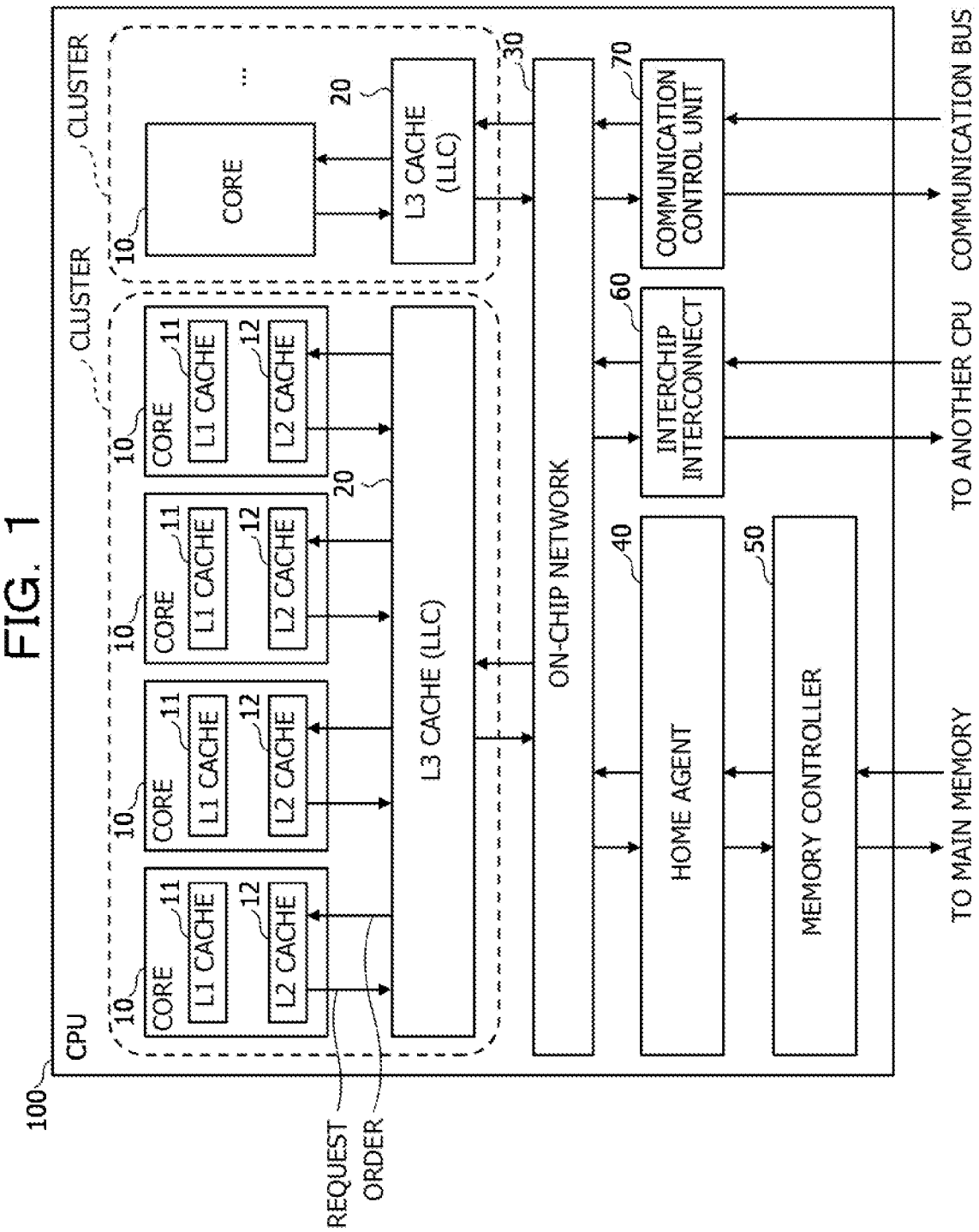
FIG. 1 is a block diagram illustrating an example of a central processing unit (CPU) according to one embodiment.

FIG. 1 illustrates an example of a CPU according to an embodiment. A CPU 100 illustrated in FIG. 1 includes a plurality of cores 10, a plurality of L3 caches 20, an on-chip network 30, a home agent 40, a memory controller 50, an interchip interconnect 60, and a communication control unit 70. The CPU 100 is an example of the semiconductor device, and each core 10 is an example of the calculation unit.

Each core 10 includes a private L1 cache 11 and an L2 cache 12, a plurality of arithmetic units (not illustrated), and the like, and performs an operation using the data stored in the L1 cache 11. For example, the L3 caches 20 are last level caches (LLCs), and are shared by four cores 10. The L2 cache 12 is an example of the higher cache, and the L3 caches 20 are an example of the lower cache.

In the description below, an instruction that is issued from an L2 cache 12 to an L3 cache 20 will be referred to as a request, and an instruction that is issued from an L3 cache 20 to an L2 cache 12 will be referred to as an order. Note that, in the description below, the higher cache may be an L1 cache 11, and the lower cache may be an L2 cache 12. In this case, an instruction from an L1 cache 11 to an L2 cache 12 is a request, and an instruction from an L2 cache 12 to an L1 cache 11 is an order.

The CPU 100 includes a plurality of clusters each including four cores 10 and one L3 cache 20, for example. The L1 caches 11, the L2 caches 12, and the L3 caches 20 then form an inclusive policy cache system in which the data held by the caches on the upper side is also held by the caches on the lower side. Also, the cache system of this embodiment adopts a write-back policy by which the data rewritten in the cache is held in a modified state in the cache, without being immediately written back into the main memory.

In the description below, an example of a cache system that operates by the so-called Modified Exclusive Shared and Invalid (MESI) protocol will be described, but the cache system may operate by some other protocol. By the MESI protocol, the data state is classified as a modified state M, an exclusive state E, a shared state S, or an invalid state I for each cache line (a cache block that holds data), which is the unit of data transfer.

For example, a cache line that holds dirty data that has been updated and rewritten by a store operation is classified as the modified state M. A cache line that holds clean data that is held in only one of the caches at the same level and has not been updated is classified as the exclusive state E. A cache line that holds clean data held in the caches at the same level is classified in the shared state S. A cache line that has become invalid due to data eviction or the like is classified as the invalid state I. In the description below, the modified state M, the exclusive state E, the shared state S, and the invalid state I will be also referred to as the M state, the E state, the S state, and the I state, respectively.

The on-chip network 30 interconnects the L3 cache 20 of each cluster, the home agent 40, the interchip interconnect 60, and the communication control unit 70 to one another. The home agent 40 has a directory resource in which information about data taken out from the main memory and stored into the L3 caches 20 is recorded, and controls coherency between the main memory and the L3 caches 20.

The memory controller 50 controls access to the main memory, in response to memory access requests issued by the L3 caches 20. The interchip interconnect 60 controls communication with another CPU 100 (chip). The communication control unit 70 controls communication with another device via a communication bus such as a peripheral component interconnect express (PCIe) bus, for example.

Figure 2:
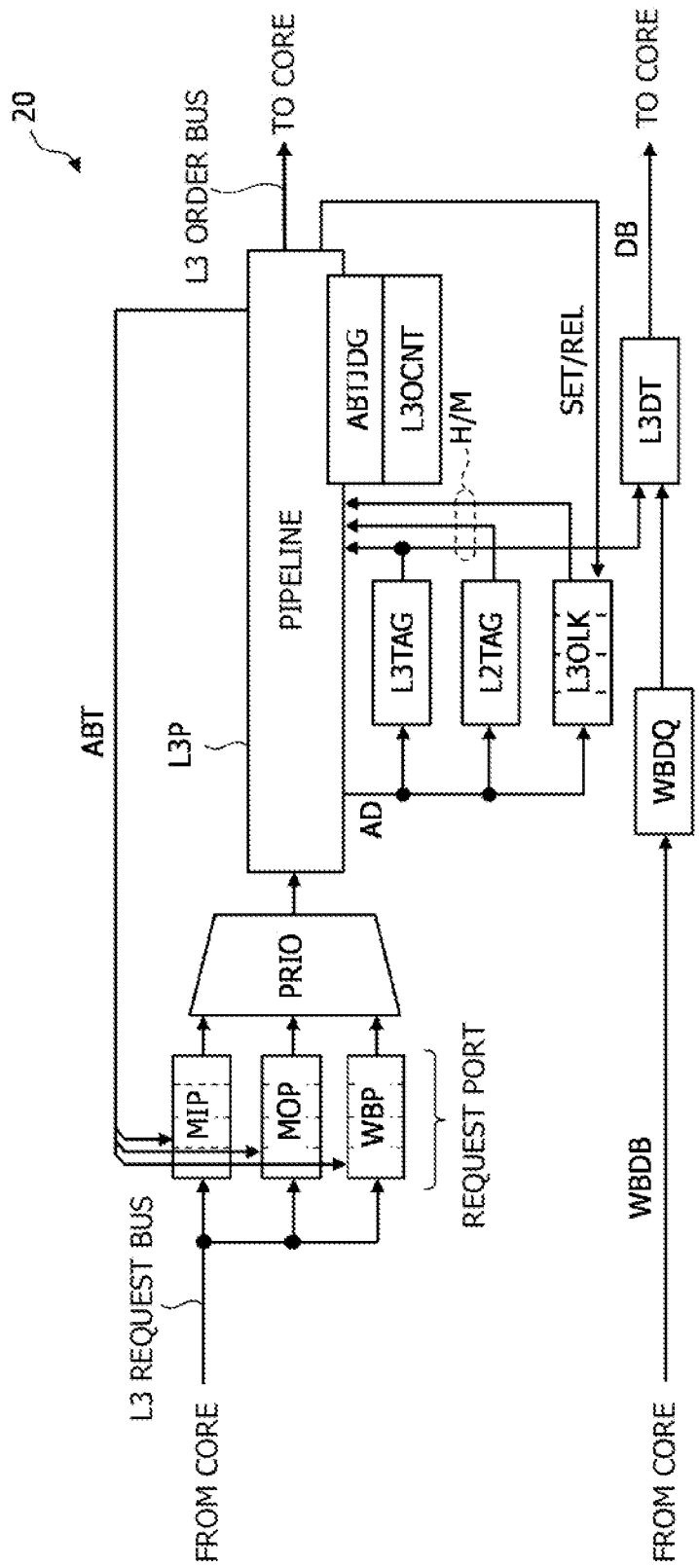
FIG. 2 is a block diagram illustrating an example of the relevant components of an L3 cache in FIG. 1.

FIG. 2 illustrates an example of the relevant components of an L3 cache 20 in FIG. 1. An L3 cache 20 includes a move-in port MIP, a move-out port MOP, a write-back port WBP, a priority circuit PRIO, a pipeline L3P, a tag unit L3TAG, a reference tag unit L2TAG, and a resource lock unit L3OLK. The L3 cache 20 also includes a data cache unit L3DT, an abort determination unit ABTJDG, a resource counter L3OCNT, and a write-back data queue WBDQ.

The move-in port MIP is an example of the first port, the move-out port MOP is an example of the third port, and the write-back port WBP is an example of the second port. The pipeline L3P is an example of the processing unit, the reference tag unit L2TAG is an example of the higher cache tag, and the data cache unit L3DT is an example of the cache unit.

The move-in port MIP has a plurality of entries that sequentially hold requests output from the L2 caches 12 (the cores 10), and outputs the requests to the priority circuit PRIO in the holding order. For example, a read request MI-SH or a read request MI-EX described later is supplied from an L2 cache 12 to the move-in port MIP. The read request MI-SH is issued in a case where data is requested in the shared state S, and the read request MI-EX is issued in a case where data is requested in the exclusive state E. The read request MI-SH and the read request MI-EX are examples of the read instruction. In the description below, a case where the read request MI-SH is issued as the read instruction is explained.

The move-out port MOP has a plurality of entries that sequentially hold responses from the L2 caches 12 to orders issued to the L2 caches 12 from the L3 cache 20, and outputs the responses to the priority circuit PRIO in the holding order. In a case where orders are issued to a plurality of cores 10, the move-out port MOP inputs responses to the pipeline L3P when all the responses from the respective cores 10 are obtained.

For example, the orders include a shared order MB-SH for causing an L2 cache 12 to return M-state data held in the L2 cache 12, and an invalidation order MB-IV for invalidating the data held in an L2 cache 12. The shared order MB-SH and the invalidation order MB-IV are examples of the eviction instruction. Note that, in this embodiment, replacement (eviction) of the data held in an L2 cache 12 is carried out by a write-back request WRBK or a flashback request FLBK actively issued by the L2 cache 12. Therefore, the L3 cache 20 does not issue a replacement order MO-RE (FIG. 9) that evicts data from the L2 cache 12. Here, the write-back request WRBK is issued with accompanying data in a case where the data to be evicted has been rewritten and is dirty. The flashback request FLBK is issued without accompanying data in a case where the data to be evicted has not been rewritten and is clean.

The write-back port WBP has a plurality of entries that hold write-back requests WRBK or flashback requests FLBK output from the L2 caches 12. The write-back port WBP outputs the write-back requests WRBK or the flashback requests FLBK to the priority circuit PRIO in the holding order. A write-back request WRBK is an example of the write-back instruction with accompanying data, and a flashback request FLBK is an example of the write-back instruction without accompanying data.

In a case where a cache miss occurs in the L3 cache 20, a read request MI-SH awaits in the move-in port MIP until data is transferred from the main memory, and therefore, the processing time in the L3 cache 20 is likely to be long. On the other hand, a write-back request WRBK overwrites the data cache unit L3DT with data evicted from an L2 cache 12, and therefore, it is not necessary to secure resources. Therefore, unlike the move-in port MIP and move-out port MOP, which require resources to be secured, the write-back port WBP is less likely to cause waiting.

For example, in a case where a write-back request WRBK is received by the move-in port MIP, the write-back processing might be delayed due to the read requests MI-SH accumulated in the move-in port MIP, and the processing performance of the cache system might be degraded. In the worst case, the pipeline L3P might deadlock, because a write-back request WRBK or a flashback request FLBK is made to wait by some other request such as a read request MI-SH. In this embodiment, the write-back port WBP dedicated to write-back requests WRBK is provided, so that write-back requests WRBK can be input to the pipeline L3P, regardless of the processing of the read requests MI-SH. As a result, the conflict between the read requests MI-SH and the write-back requests WRBK can be reduced, and thus, degradation of the processing performance of the cache system can be reduced.

The priority circuit PRIO selects one of the requests or responses output from the move-in port MIP, the move-out port MOP, and the write-back port WBP, and inputs the selected request or response to the pipeline L3P.

The pipeline L3P refers to the tag unit L3TAG in response to a read request MI-SH received from the priority circuit PRIO, for example, and determines a cache hit or a cache miss. Note that the tag unit L3TAG holds tag information indicating the states of the respective cache lines of the data cache unit L3DT. A cache hit indicates that the target data of the read request MI-SH is held in the data cache unit L3DT. A cache miss indicates that the target data of the read request MI-SH is not held in the data cache unit L3DT. The pipeline L3P updates the tag unit L3TAG every time the state of the data cache unit L3DT changes.

In a case where the pipeline L3P determines a cache hit, the pipeline L3P reads data from the data cache unit L3DT, and outputs the read data as a response to the read request MI-SH, to the L2 caches 12 via a data bus DB. Note that the pipeline L3P refers to the reference tag unit L2TAG, on the basis of the cache hit. In a case where the target data of the read request MI-SH is held in the L2 cache 12 of another core 10, the pipeline L3P then issues a shared order MB-SH to the L2 cache 12 holding the target data. The shared order MB-SH is supplied to the core 10 via an L3 order bus.

In a case where the pipeline L3P issues a shared order MB-SH, the pipeline L3P reserves an entry of the move-out port MOP, and stores the target address of the shared order MB-SH into an entry of the resource lock unit L3OLK. The pipeline L3P also updates (or counts up, for example) the resource counter L3OCNT, which indicates the number of entries used in the resource lock unit L3OLK. Note that the resource lock unit L3OLK has the same number of entries as the entries of the move-out port MOP.

With this arrangement, the number of shared orders MB-SH issued to the L2 caches 12 can be managed by the resource lock unit L3OLK and the resource counter L3OCNT. For example, in a case where the pipeline L3P receives a request for an address held by the resource lock unit L3OLK via the move-in port MIP, the pipeline L3P continues to abort the request until the lock by the resource lock unit L3OLK is released.

In a case where the L3 cache 20 receives a response to the shared order MB-SH from an L2 cache 12, the L3 cache 20 stores the received response into the reserved move-out port MOP. The response stored into the move-out port MOP is input to the pipeline L3P via the priority circuit PRIO. In a case where the response indicates that M-state data is contained, the pipeline L3P stores the data received from the L2 cache 12 into the write-back data queue WBDQ via a write-back data bus WBDB. The data stored into the write-back data queue WBDQ is stored into the data cache unit L3DT, under the control of the pipeline L3P.

The pipeline L3P then sends, via the data bus DB, the data held in the data cache unit L3DT as a response to the L2 cache 12 that is the issuer of the read request MI-SH. The pipeline L3P also cancels the reservation of the move-out port MOP that received the response, cancels the use of the entry of the resource lock unit L3OLK, and updates (or counts down, for example) the resource counter L3OCNT. As a result, the address lock is released, and the aborting of requests for the same address is stopped.

Note that the pipeline L3P updates the reference tag unit L2TAG every time the data holding state of an L2 cache 12 changes. For example, the reference tag unit L2TAG is provided for each of the L2 caches 12 that share the L3 cache 20. As a result, the state of the reference tag unit L2TAG always indicates the state of the tag region of each L2 cache 12.

In a case where the pipeline L3P determines a cache miss on the basis of the read request MI-SH, the pipeline L3P issues a read request to the main memory. The pipeline L3P holds, in the data cache unit L3DT, data transferred from the main memory via a memory bus (not illustrated), and updates the tag unit L3TAG. The pipeline L3P then sends, via the data bus DB, the data transferred from the main memory as a response to the L2 cache 12 that is the issuer of the read request MI-SH.

Although a replacement operation between an L2 cache 12 and the L3 cache 20 will be described below, this operation can be applied to a replacement operation between other cache hierarchical levels.

Figure 3:
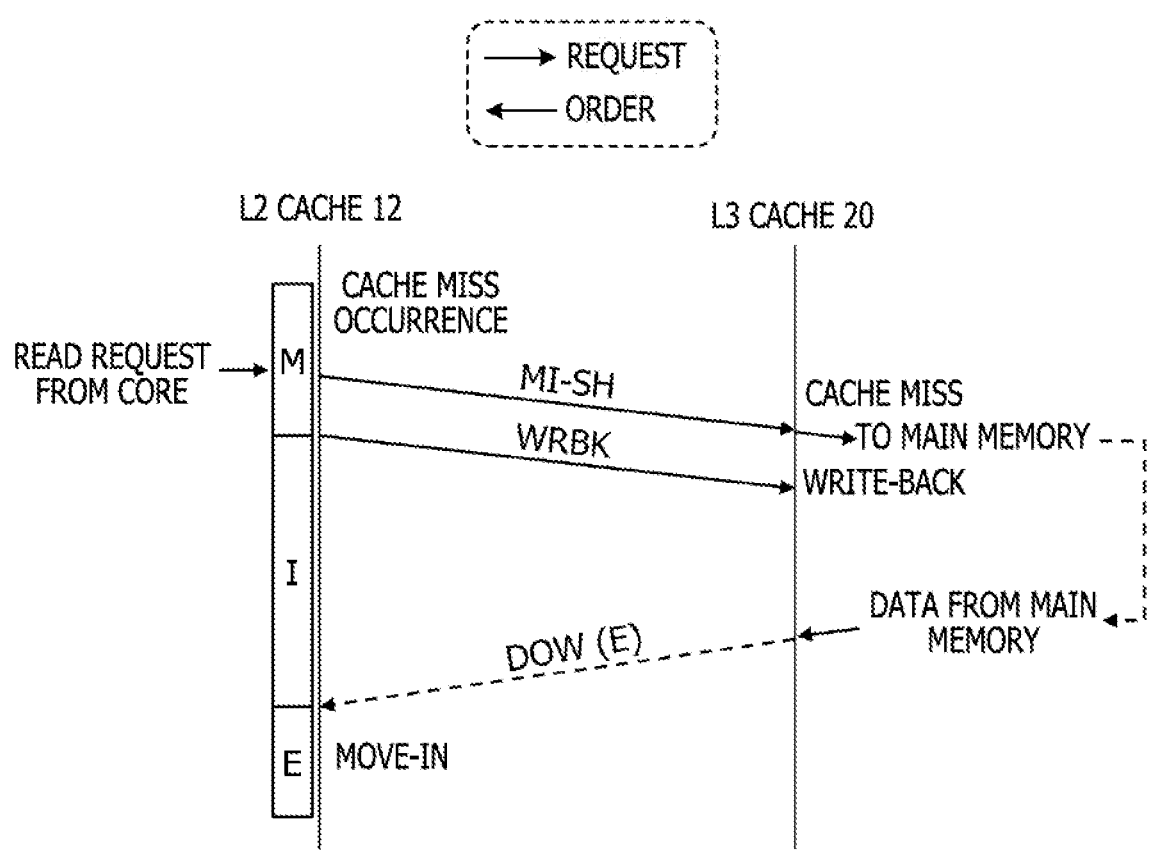
FIG. 3 is a sequence diagram illustrating an example operation of the CPU illustrated in FIG. 1.

FIG. 3 illustrates an example operation of the CPU 100 illustrated in FIG. 1. Referring to FIG. 3, a normal replacement operation to be performed when a cache miss occurs in an L2 cache 12 is described. The L2 cache 12 determines a cache miss of a read request (the load instruction) from the core 10, and issues a read request MI-SH (the read request) to the L3 cache 20.

The L3 cache 20 sets the read request MI-SH received from the L2 cache 12 in the move-in port MIP. The read request MI-SH is input to the pipeline L3P via the priority circuit PRIO. The pipeline L3P outputs the address AD contained in the read request MI-SH to the tag unit L3TAG, and performs cache hit/miss determination (H/M).

Since the read request MI-SH made a cache miss, the L3 cache 20 issues a read request to the main memory via the home agent 40. Note that, in this embodiment, the L3 cache 20 does not issue a replacement order to the L2 cache 12 to evict Victim data from the L2 cache 12. Therefore, the L3 cache 20 does not reserve the move-out port MOP, and the states of the resource lock unit L3OLK and the resource counter L3OCNT do not change.

To enable holding of the data transferred from the L3 cache 20 in accordance with the read request MI-SH, the L2 cache 12 performs an eviction process on the Victim cache line to be evicted. Since the data in the Victim cache line is in the modified state M, the L2 cache 12 issues a write-back request WRBK containing the address and the data to be evicted, to the L3 cache 20. The L2 cache 12 switches the cache line holding the Victim data from the M state to the I state. Note that, in a case where the Victim data is in the S state, the L2 cache 12 issues a flashback request FLBK that contains the eviction target's address but does not contain the data, to the L3 cache 20.

Following the issuance of the read request MI-SH, a write-back request WRBK is issued, but a replacement order MO-RE (FIG. 9) from the L3 cache 20 is not awaited, so that the Victim data can be promptly evicted from the L2 cache 12. As a result, the replacement order MO-RE to be issued from the L3 cache 20 can be made unnecessary during the replacement process, and the replacement process can be simplified accordingly.

The L3 cache 20 sets the write-back request WRBK received from the L2 cache 12 in the write-back port WBP. The write-back request WRBK set in the write-back port WBP is input to the pipeline L3P via the priority circuit PRIO. The pipeline L3P writes the data back into the data cache unit L3DT, and updates the target region in the reference tag unit L2TAG from a valid state V indicating data holding to the invalid state I indicating no data holding. That is, a write-back process is performed.

Here, the valid state V indicates that the L2 cache 12 holds valid data (in the E state or the S state). In a case where the L2 cache 12 rewrites data in the S state and changes the data to the M state, the L2 cache 12 exclusively holds the data in the E state, and then rewrites the data to change the data from the E state to the M state. The L3 cache 20 knows whether the data has changed from the S state to the E state, but is not able to determine whether the data has changed from the E state to the M state. Therefore, the M state in the L2 cache 12 is determined to be the valid state V (the E state) by the L3 cache 20. Note that the operation of the L3 cache 20 in a case where the L3 cache 20 has received a flashback request FLBK is similar to the processing of a write-back request WRBK, except that the data is not written back into the data cache unit L3DT. For example, the L3 cache 20 sets "0" in the valid bit V corresponding to the core 10 that has transmitted the flashback request FLBK, and sets the I state in a case where the valid bits V of all the cores 10 are "0".

As illustrated in FIG. 3, the L2 cache 12 actively issues a write-back request WRBK (or a flashback request FLBK) to the L3 cache 20 when a cache miss occurs. Meanwhile, the L3 cache 20 does not issue a replacement order to evict Victim data from the L2 cache 12. As a result, a data buffer resource that holds Victim data until a replacement process is completed, such as a replacement buffer RPB or a move-in data buffer MIDQ illustrated in FIGS. 9 to 12, can be deleted from the L2 cache 12. Since the L2 cache 12 exists for each core 10, the effect to reduce the chip size and power consumption of the CPU 100 by deleting the data buffer resource becomes greater as the number of cores 10 mounted in the CPU 100 becomes larger.

The L3 cache 20 receives the target data of the read request MI-SH from the main memory via the home agent 40, and issues a response DOW(E) containing the received target data to the L2 cache 12. The L2 cache 12 stores (moves) the data contained in the response DOW(E) into the I-state cache line from which the Victim data has been evicted, and switches the state of the cache line from the I state to the E state.

In this embodiment, since the L3 cache 20 does not issue a replacement order, the L3 cache 20 does not receive a response to a replacement order from the L2 cache 12. Therefore, the L3 cache 20 does not reserve the move-out port MOP to receive the Victim data from the L2 cache 12, and the resource lock unit L3OLK does not lock the address resource.

Therefore, instead of the move-out port MOP, a mechanism that receives write-back requests WRBK is preferably provided. Also, instead of the lock function of the resource lock unit L3OLK, a mechanism that stops other processes on the target address of Victim data until the Victim data is stored into the data cache unit L3DT is preferably provided. Reception of Victim data in response to a write-back request WRBK is carried out by the write-back port WBP. A mechanism that stops other processes on the target address of Victim data on the basis of reception of a write-back request WRBK will be described later with reference to FIGS. 7 and 8.

Figure 4:
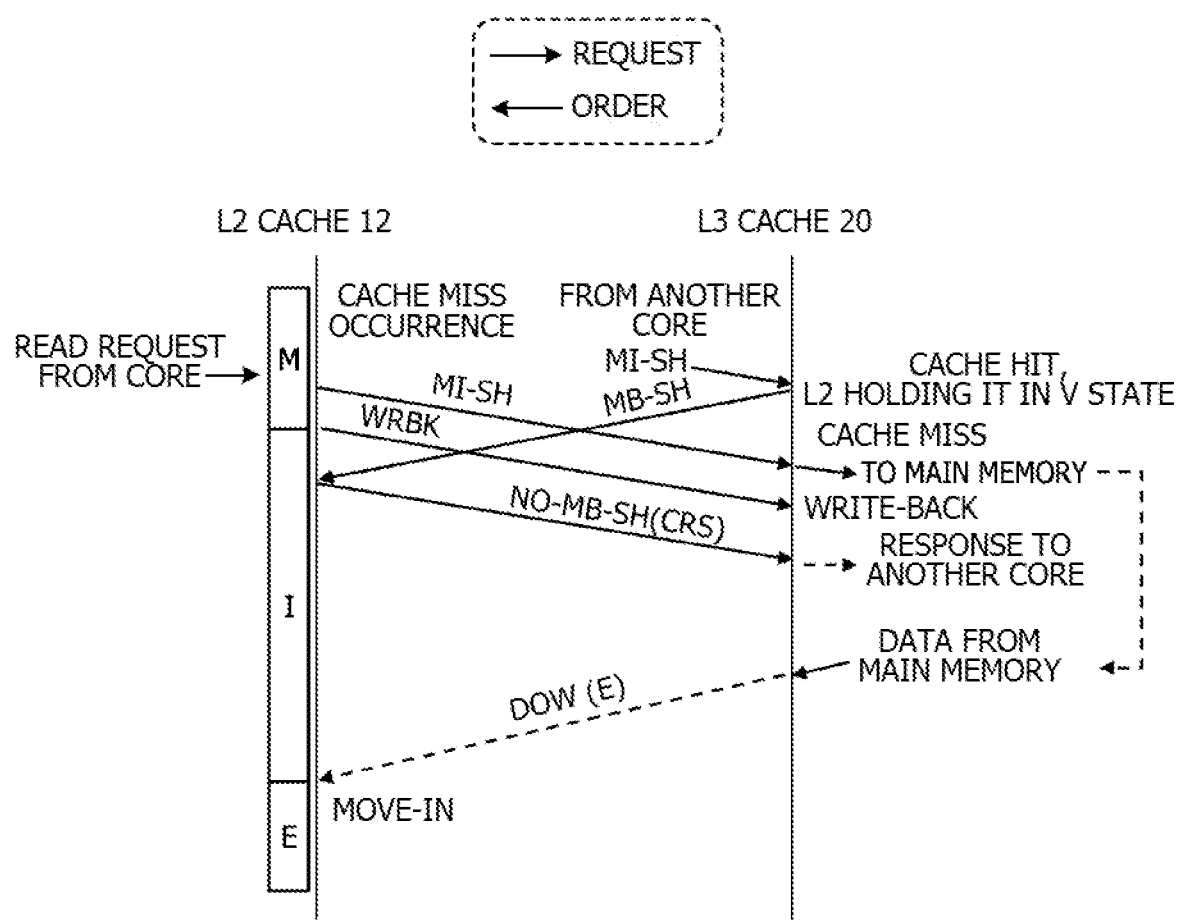
FIG. 4 is a sequence diagram illustrating another example operation of the CPU illustrated in FIG. 1.

FIG. 4 illustrates another example operation of the CPU 100 illustrated in FIG. 1. As for the actions similar to those illustrated in FIG. 3, detailed explanation of them is not made herein. FIG. 4 illustrates a case where a replacement operation due to a cache miss in the L2 cache 12, and a shared order MB-SH due to a cache miss in the L3 cache 20 conflict with each other.

An operation to be performed by the L2 cache 12 to issue a read request MI-SH to the L3 cache 20 on the basis of a cache miss, and then issue a write-back request WRBK to the L3 cache 20 is similar to that illustrated in FIG. 3. Also, an operation to be performed by the L3 cache 20 that has received a read request MI-SH to issue a read request to the main memory after making a cache miss, and output the data received from the main memory as a response DOW(E) to the L2 cache 12 is similar to that illustrated in FIG. 3.

Before receiving a read request MI-SH from the L2 cache 12, the L3 cache 20 receives a read request MI-SH due to a cache miss in the L2 cache 12 of another core 10. The read request MI-SH from the another core 10 is set in the move-in port MIP, and is input to the pipeline L3P via the priority circuit PRIO.

The pipeline L3P determines a cache hit, on the basis of a comparison between the address AD contained in the read request MI-SH from the another core 10 and the address held in the tag unit L3TAG. Here, the target address of the read request MI-SH from the another core 10 is assumed to be the Victim address to be evicted in response to a write-back request WRBK. The L3 cache 20 has not yet received a write-back request WRBK from the L2 cache 12.

The pipeline L3P refers to the reference tag unit L2TAG, and detects that the L2 cache 12 that issues the write-back request WRBK holds the target data of the read request MI-SH from the another core 10 in the M state. The pipeline L3P reserves a MOP port, reserves one of the entries of the resource lock unit L3OLK, and increments the resource counter L3OCNT. The L3 cache 20 then issues a shared order MB-SH to the L2 cache 12 that issues the write-back request WRBK.

The L3 cache 20 that has received the write-back request WRBK sets the write-back request WRBK in the write-back port WBP. The write-back request WRBK is input to the pipeline L3P via the priority circuit PRIO. The pipeline L3P performs a write-back process to write the data back into the data cache unit L3DT.

The L2 cache 12 that has received the shared order MB-SH determines that tag information about the L2 cache 12 is in the I state and does not hold the data to be returned. This is because the data to be returned has already been evicted by the write-back request WRBK. Therefore, the L2 cache 12 issues, to the L3 cache 20, a response NO-MB-SH(CRS) without accompanying data as a response to the shared order MB-SH. Here, the response NO-MB-SH(CRS) includes a cross flag CRS that is to be added when the cache line of the address requested by the shared order MB-SH is in the I state. Note that, in a case where the L2 cache 12 receives an invalidation order at the same timing as the shared order MB-SH, the L2 cache 12 issues a response NO-MB-IV(CRS) to the L3 cache 20. The responses NO-MB-SH(CRS) and NO-MB-IV(CRS) are examples of the eviction response.

The L3 cache 20 stores the received response NO-MB-SH(CRS) into the reserved move-out port MOP. The response NO-MB-SH(CRS) is input to the pipeline L3P via the priority circuit PRIO. The pipeline L3P releases the lock by the corresponding resource lock unit L3OLK, and decrements the resource counter L3OCNT. At this stage, on the basis of the cross flag CRS added to the response NO-MB-SH(CRS), the pipeline L3P can detect that the data to be returned in response to the shared order MB-SH has already been returned. The pipeline L3P then sends the corresponding data as a response to the another core 10 that issued the read request MI-SH.

Figure 5:
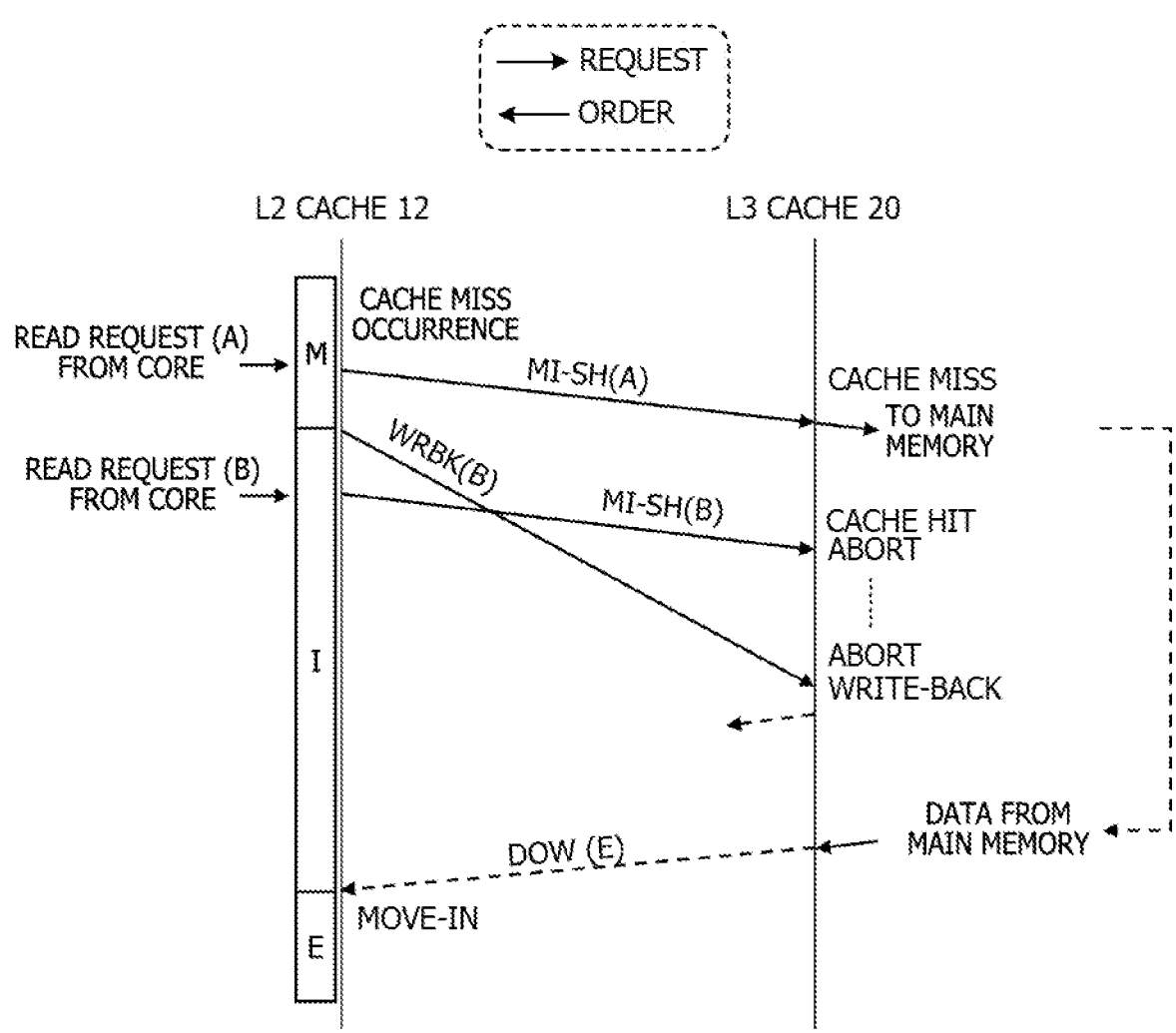
FIG. 5 is a sequence diagram illustrating yet another example operation of the CPU illustrated in FIG. 1.

FIG. 5 illustrates yet another example operation of the CPU 100 illustrated in FIG. 1. As for the actions similar to those illustrated in FIG. 3, detailed explanation of them is not made herein. In FIG. 5, the L2 cache 12 issues a read request MI-SH(A) to the L3 cache 20, because a read request at an address (A) received from the core 10 has made a cache miss. The operation from the issuance of the read request MI-SH(A) to the response DOW(E) is similar to that illustrated in FIG. 3. Note that FIG. 5 illustrates an example operation in which the L2 cache 12 issues a write-back request WRBK, but an operation in which a flashback request FLBK is issued is also similar to that illustrated in FIG. 5.

The L2 cache 12 receives a read request of an address (B) from the core 10 after evicting the data corresponding to the address (B) from the core 10 in response to a write-back request WRBK(B). Having already evicted the data at the address (B), the L2 cache 12 determines a cache miss, and issues a read request MI-SH(B) to the L3 cache 20. Here, the arrival of the write-back request WRBK(B) at the L3 cache 20 might be delayed. In this case, the read request MI-SH(B) arrives at the L3 cache 20 before the write-back request WRBK(B).

On the basis of the information held in the reference tag unit L2TAG, the pipeline L3P of the L3 cache 20 determines that the target data of the read request MI-SH(B) is still held in the L2 cache 12 (the V state). In this embodiment, the abort determination unit ABTJDG determines that the write-back request WRBK issued before the read request MI-SH has not arrived. The pipeline L3P then aborts the read request MI-SH(B) input from the move-in port MIP, on the basis of the result of the determination performed by the abort determination unit ABTJDG.

The abort is repeatedly performed until reception of the write-back request WRBK(B) and completion of the write-back process. As a result, other processes on the address (B) can be stopped, and the order relation between accesses that occur during a replacement process can be guaranteed. That is, malfunctions of the CPU 100 and the cache system can be reduced, and data coherency can be maintained.

Note that the move-in port MIP may stand by without inputting the read request MI-SH(B) to the pipeline L3P, until the write-back request WRBK(B) is received by the write-back port WBP and is processed by the pipeline L3P. In this case, the abort of the read request MI-SH(B) at the pipeline L3P is reduced, and thus, the processing efficiency of the pipeline L3P can be increased.

The pipeline L3P stores the data contained in the write-back request WRBK(B) into the data cache unit L3DT, changes the cache state from the V state to the I state, and then starts the processing of the read request MI-SH(B). The pipeline L3P then returns, to the L2 cache 12, a response (not illustrated) to the read request MI-SH(B), and again sets the cache state to the V state. Note that the L2 cache 12 reissues the write-back request WRBK(B) after issuing the read request MI-SH(B), but this is not illustrated in FIG. 5.

Figure 6:
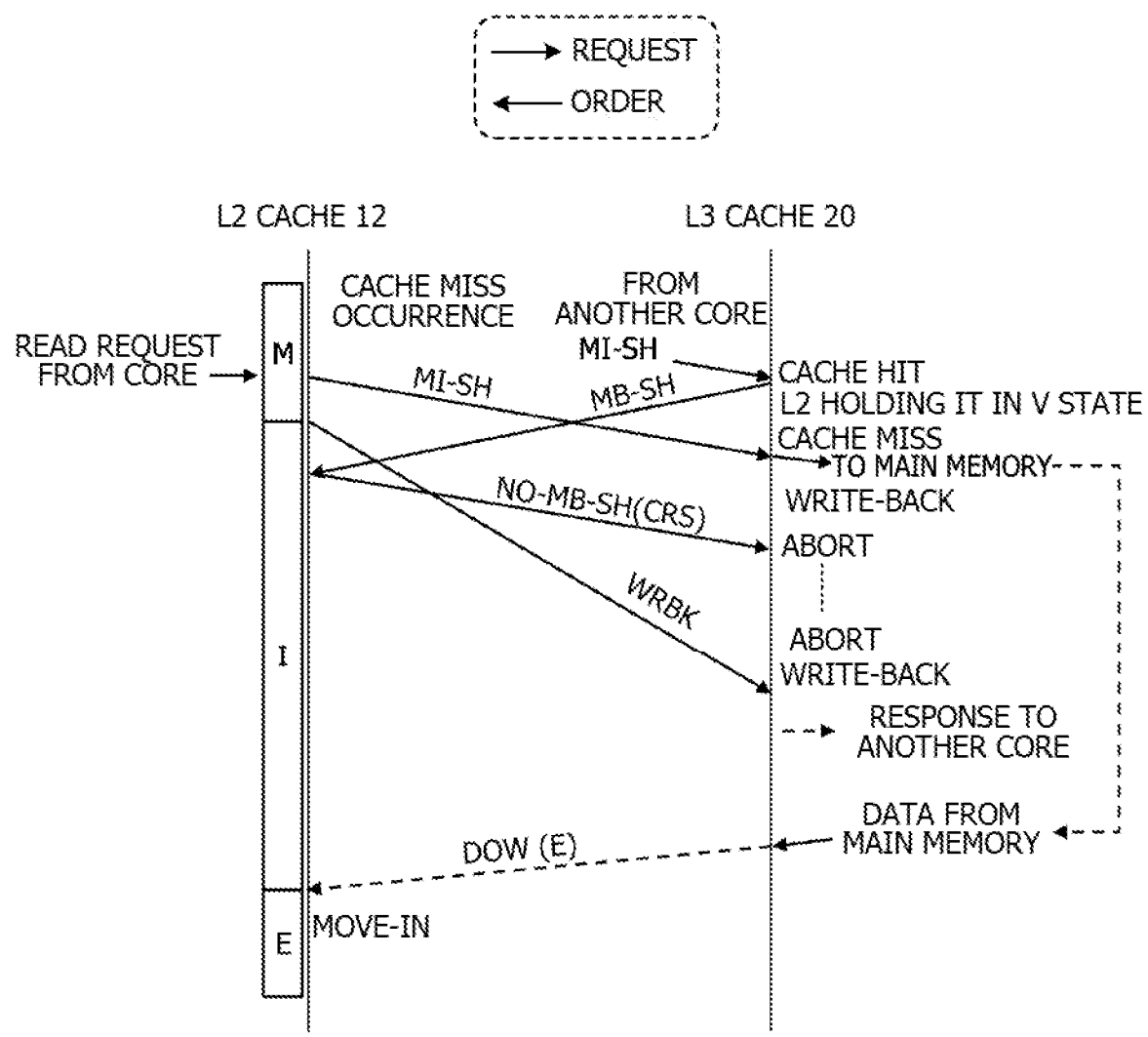
FIG. 6 is a sequence diagram illustrating another example operation of the CPU illustrated in FIG. 1.

FIG. 6 illustrates another example operation of the CPU 100 illustrated in FIG. 1. As for the actions similar to those illustrated in FIGS. 3 and 4, detailed explanation of them is not made herein. The operation illustrated in FIG. 6 is similar to the operation illustrated in FIG. 4, except that the arrival of a write-back request WRBK at the L3 cache 20 is later than the arrival of a response NO-MB-SH(CRS) to a shared order MB-SH at the L3 cache 20. In addition, FIG. 6 illustrates an example operation in which the L2 cache 12 issues a write-back request WRBK, but an operation in which a flashback request FLBK is issued is also similar to that illustrated in FIG. 6.

The L3 cache 20 stores the response NO-MB-SH(CRS) to the shared order MB-SH into the reserved move-out port MOP. The pipeline L3P receives the response NO-MB-SH (CRS) via the priority circuit PRIO. However, the region corresponding to the response NO-MB-SH(CRS) in the reference tag unit L2TAG is in the V state, and therefore, the pipeline L3P determines that the corresponding write-back request WRBK has not arrived. In this embodiment, the abort determination unit ABTJDG determines that the write-back request WRBK issued before the response NO-MB-SH(CRS) has not arrived.

On the basis of the result of the determination made by the abort determination unit ABTJDG, the pipeline L3P continues to abort the response NO-MB-SH(CRS) being input from the move-out port MOP, until reception of the write-back request WRBK and completion of the write-back process. Note that the move-out port MOP may stand by without inputting the response NO-MB-SH(CRS) to the pipeline L3P, until the write-back request WRBK(B) is received by the write-back port WBP and is processed by the pipeline L3P.

After this, the pipeline L3P receives the write-back request WRBK, and performs the write-back process. After the pipeline L3P overwrites the data cache unit L3DT with the eviction target data contained in the write-back request WRBK, the L3 cache 20 then sends the overwritten data as a response to the another core 10 that issued the read request MI-SH.

In this embodiment, when the response NO-MB-SH (CRS) is received, the abort determination unit ABTJDG determines that the write-back request WRBK has not arrived, and aborts the response NO-MB-SH(CRS). Thus, the erroneous data before being written back can be stopped from being transferred to the another core 10, on the basis of the response NO-MB-SH(CRS). As a result, malfunctions of the CPU 100 and the cache system can be reduced, and data coherency can be maintained.

Figure 7:
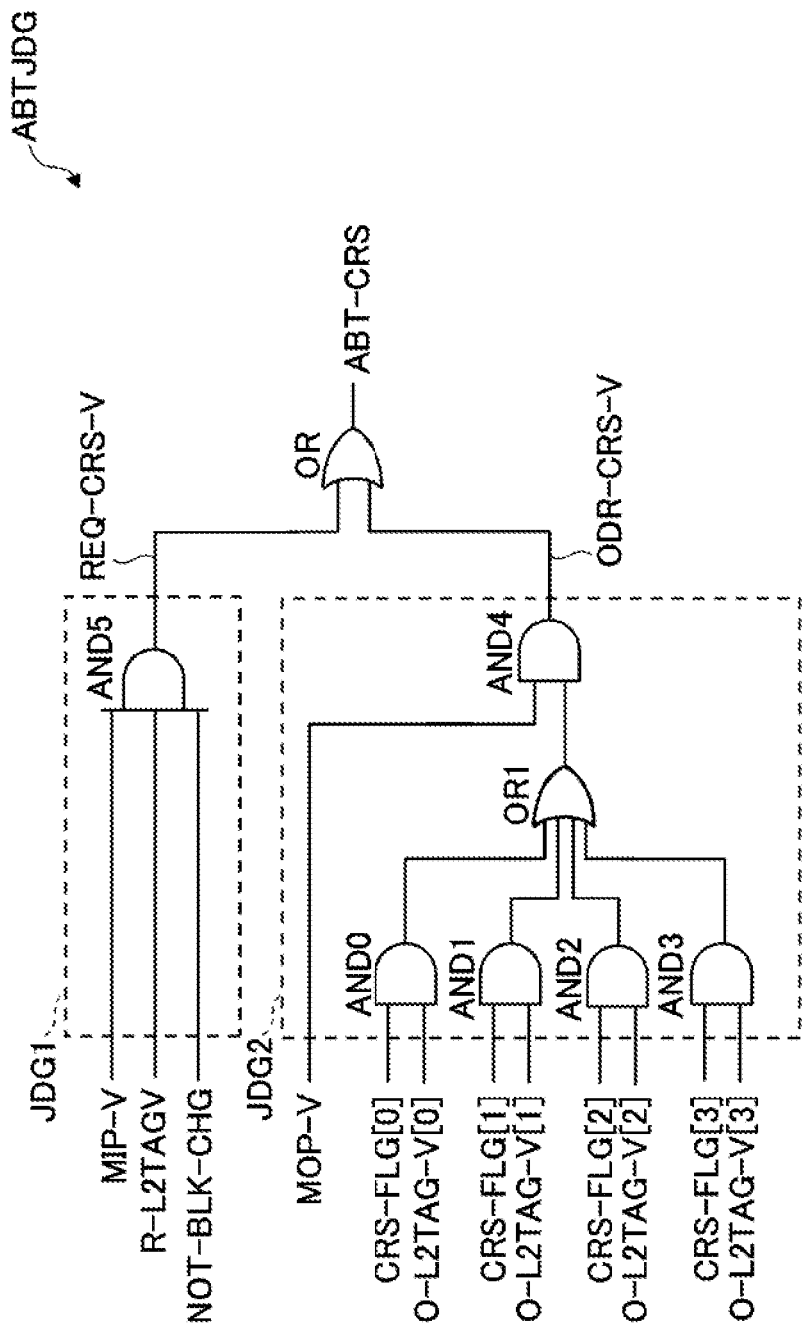
FIG. 7 is a circuit diagram illustrating an example of the relevant components of the abort determination unit illustrated in FIG. 2.

FIG. 7 illustrates an example of the relevant components of the abort determination unit ABTJDG illustrated in FIG. 2. The abort determination unit ABTJDG includes a first determination unit JDG1, a second determination unit JDG2, and an OR circuit OR. The first determination unit JDG1 is provided to abort a request in a case where the target data of the request is in the V state at the time of reception of the request from the L2 cache 12. For example, as illustrated in FIG. 5, the first determination unit JDG1 aborts a read request MI-SH(B) that is issued after a write-back request WRBK(B) and arrives at the L3 cache 20 before the write-back request WRBK(B).

The second determination unit JDG2 is provided to abort an order response in a case where the target data is in the V state at the time of reception of the order response containing a cross flag CRS from the L2 cache 12. For example, as illustrated in FIG. 6, the second determination unit JDG2 aborts the response NO-MB-SH(CRS) that is issued after a write-back request WRBK and arrives at the L3 cache 20 before the write-back request WRBK.

The first determination unit JDG1 includes an AND circuit AND5 that receives a request processing signal MIP-V, a request tag signal R-L2TAG-V, and an exclusion signal NOT-BLK-CHG. The request processing signal MIP-V is set to high level when the request from the L2 cache 12 set in the move-in port MIP is being processed by the pipeline L3P, and is set to low level when the processing of the request is completed.

The request tag signal R-L2TAG-V is set to high level in a case where the reference tag unit L2TAG indicates the V state in which the target data of a request from the L2 cache 12 is brought out to the L2 cache 12. Also, the request tag signal R-L2TAG-V is set to low level in a case where the reference tag unit L2TAG indicates the I state in which the target data is not brought out to the L2 cache 12.

The exclusion signal NOT-BLK-CHG is set to low level in a case where a request for exclusivity (the E state) from the L2 cache 12 that has a shared cache line is processed by the pipeline L3P. In any other cases, the exclusion signal NOT-BLK-CHG is set to high level.

A read request MI-SH is issued in the I state (at a time of a cache miss) in which the L2 cache 12 does not hold the target data. For example, as illustrated in FIG. 3, when the L3 cache 20 receives the read request MI-SH, the target region in the reference tag unit L2TAG is in the I state. Therefore, in the normal state, the request processing signal MIP-V and the request tag signal R-L2TAG-V are not at high level at the same time, and a request cross signal REQ-CRS-V is maintained at low level.

Meanwhile, as illustrated in FIG. 5, when a read request MI-SH(B) is input to the pipeline L3P, if the write-back process for the target data has not been performed, the reference tag unit L2TAG corresponding to the target data of the request is in V state. Therefore, the request processing signal MIP-V and the request tag signal R-L2TAG-V are at high levels at the same time until reception of a write-back request WRBK(B) and execution of the write-back process. As a result, the request cross signal REQ-CRS-V changes to high level, and an abort signal ABT-CRS changes to high level, so that the read request MI-SH(B) is aborted.

In other words, in a case where the abort signal ABT-CRS output from the abort determination unit ABTJDG is at high level, the pipeline L3P aborts the target read request MI-SH (B). Accordingly, the L3 cache 20 can continue to abort the read request MI-SH(B) until the processing of the write-back request WRBK(B), as illustrated in FIG. 5. As a result, malfunctions of the CPU 100 and the cache system can be reduced, and data coherency can be maintained.

Note that, in a case where a request for exclusivity (the E state) from the L2 cache 12 having an S-state cache line is processed by the pipeline UP, the request processing signal MIP-V and the request tag signal R-L2TAG-V are both at high level. In this case, however, the low-level exclusion signal NOT-BLK-CHG can stop the request cross signal REQ-CRS-V (high level) from being output from the AND circuit AND5. Thus, it is possible to stop the abort signal ABT-CRS from being output at the time of processing of the request for exclusivity (the E state) at the pipeline L3P, and malfunctions of the pipeline L3P can be reduced.

The second determination unit JDG2 includes AND circuits AND0, AND1, AND2, and AND3, an OR circuit OR1, and an AND circuit AND4. The AND circuits AND0, AND1, AND2, and AND3 each output the logical product of a cross flag signal CRS-FLG and an order tag signal O-L2TAG-V to the OR circuit OR1. The numbers in brackets at the ends of the cross flag signals CRS-FLG and the order tag signals O-L2TAG-V indicate the identification numbers of the cores 10 in which the L2 caches 12 are mounted. For example, in a case where the CPU 100 includes n (n being an integer of 2 or greater) cores 10, n AND circuits AND that receive the cross flag signals CRS-FLG and the order tag signals O-L2TAG-V are provided and are associated with the respective cores 10.

The input of the OR circuit OR1 is connected to each of the outputs of the AND circuits AND0 to AND3, and the output of the OR circuit OR1 is connected to the input of the AND circuit AND4. The AND circuit AND4 outputs the logical product of a response processing signal MOP-V and an output signal from the OR circuit OR1, as an order cross signal ODR-CRS-V. The response processing signal MOP-V was set to high level when the response to an order to the L2 cache 12 set in the move-out port MOP is being processed by the pipeline L3P, and is set to low level when the processing of the response to the order is completed.

The cross flag signal CRS-FLG is set to high level in a case where a response NO-MB-SH(CRS) with an accompanying cross flag CRS to a shared order MB-SH issued by the L3 cache 20 is received from the L2 cache 12. Also, the cross flag signal CRS-FLG is set to low level in a case where a response NO-MB-SH(CRS) with an accompanying cross flag CRS to a shared order MB-SH is not received from any L2 cache 12.

The order tag signal O-L2TAG-V is set to high level in a case where the reference tag unit L2TAG indicates that the target data of a shared order MB-SH is brought out to the L2 cache 12 (the V state). Also, the order tag signal O-L2TAG-V is set to low level in a case where the reference tag unit L2TAG indicates that the target data has not been brought out to the L2 cache 12 (the I state).

For example, in the operation illustrated in FIG. 4, before the L3 cache 20 receives a write-back request WRBK, the cross flag signal CRS-FLG is set to low level, and the order tag signal O-L2TAG-V is set to high level. The order tag signal O-L2TAG-V is set to low level when the L3 cache 20 receives the write-back request WRBK and writes Victim data back into the tag unit L3TAG.

The cross flag signal CRS-FLG is then set to high level while the L3 cache 20 is processing the response NO-MB-SH(CRS) with an accompanying cross flag corresponding to the shared order MB-SH. Therefore, in a case where the L3 cache 20 receives the response NO-MB-SH(CRS) after receiving the write-back request WRBK, both the cross flag signal CRS-FLG and the order tag signal O-L2TAG-V are not at high level during any period. Accordingly, in the operation illustrated in FIG. 4, the order cross signal ODR-CRS-V does not change to high level during the period in which a response to the shared order MB-SH is awaited, and the response processing signal MOP-V is at high level. Thus, the abort signal ABT-CRS does not change to high level.

On the other hand, in a case where the response NO-MB-SH(CRS) is received before reception of the write-back request WRBK as illustrated in FIG. 6, the cross flag signal CRS-FLG changes to high level before the order tag signal O-L2TAG-V changes to low level. As a result, both the cross flag signal CRS-FLG and the order tag signal O-L2TAG-V are at high level during some period, and the corresponding AND circuit AND (one of the AND circuits AND0 to AND3) outputs a high level indicating a crossed state.

Here, the crossed state means that the write-back request WRBK that is output from the L2 cache 12 earlier than the response NO-MB-SH(CRS) is received by the L3 cache 20 later than the response NO-MB-SH(CRS). In a case where the crossed state occurs, the order cross signal ODR-CRS-V changes to high level, and the abort signal ABT-CRS changes to high level. In a case where the abort signal ABT-CRS output from the abort determination unit ABTJDG is at high level, the pipeline L3P aborts the target response NO-MB-SH(CRS).

Accordingly, as illustrated in FIG. 6, the L3 cache 20 can continue to abort the response NO-MB-SH(CRS) with the same target data, until the write-back request WRBK is processed. As a result, malfunctions of the CPU 100 and the cache system can be reduced, and data coherency can be maintained.

Note that the move-out port MOP inputs a response to the pipeline L3P, on the basis of reception of responses (NO-MB-SH or NO-MB-SH(CRS)) from all the cores 10 that issued the shared order MB-SH.

Figure 8:
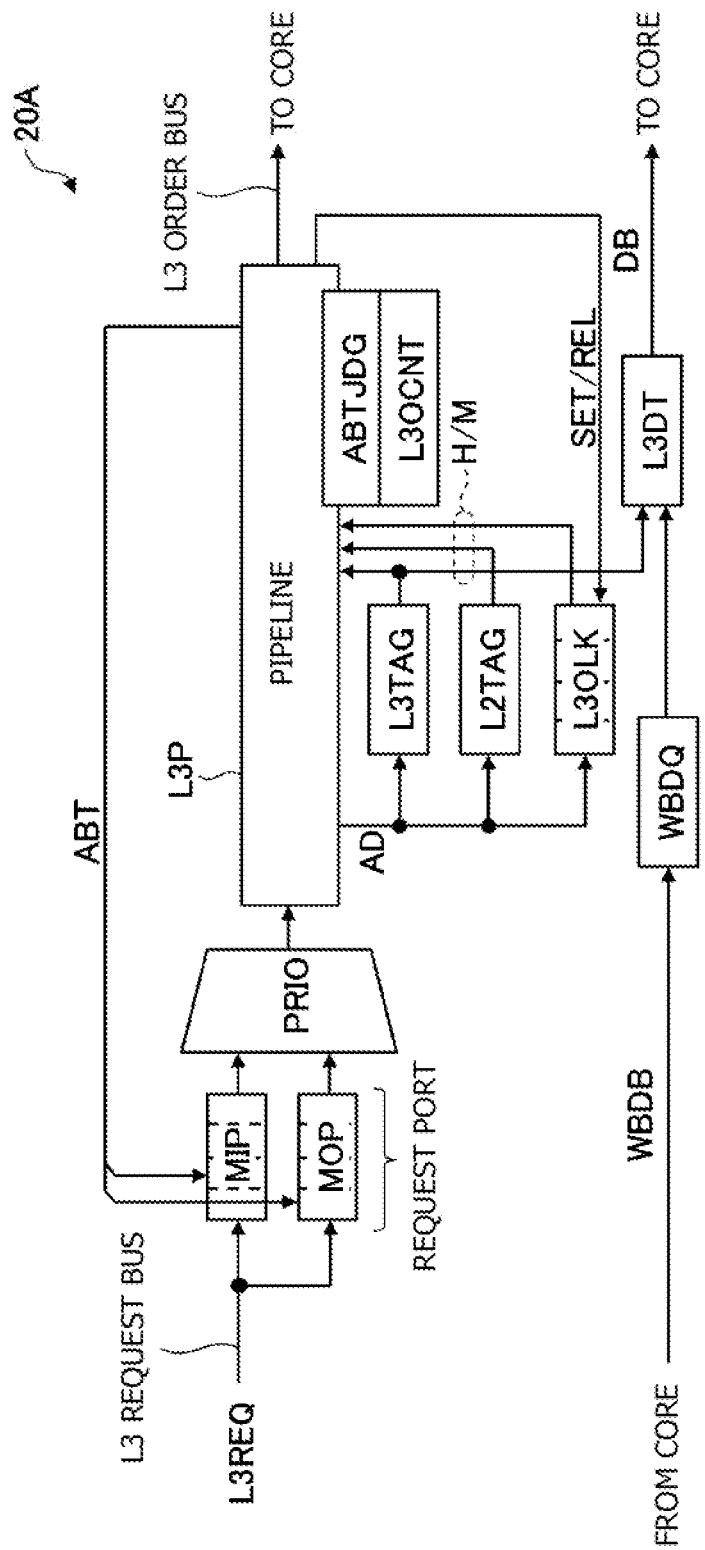
FIG. 8 is a block diagram illustrating an example (a comparative example) of the relevant components of another L3 cache mounted in the CPU illustrated in FIG. 1.

FIG. 8 illustrates an example (a comparative example) of the relevant components of another L3 cache 20A mounted in the CPU 100 illustrated in FIG. 1. The configuration of the L3 cache 20A is similar to the configuration of the L3 cache 20 illustrated in FIG. 2, except for not including the write-back port WBP. Note that some of the functions of the priority circuit PRIO and the abort determination unit ABTJDG in FIG. 8 differ from the functions of the priority circuit PRIO and the abort determination unit ABTJDG illustrated in FIG. 2.

Figure 9:
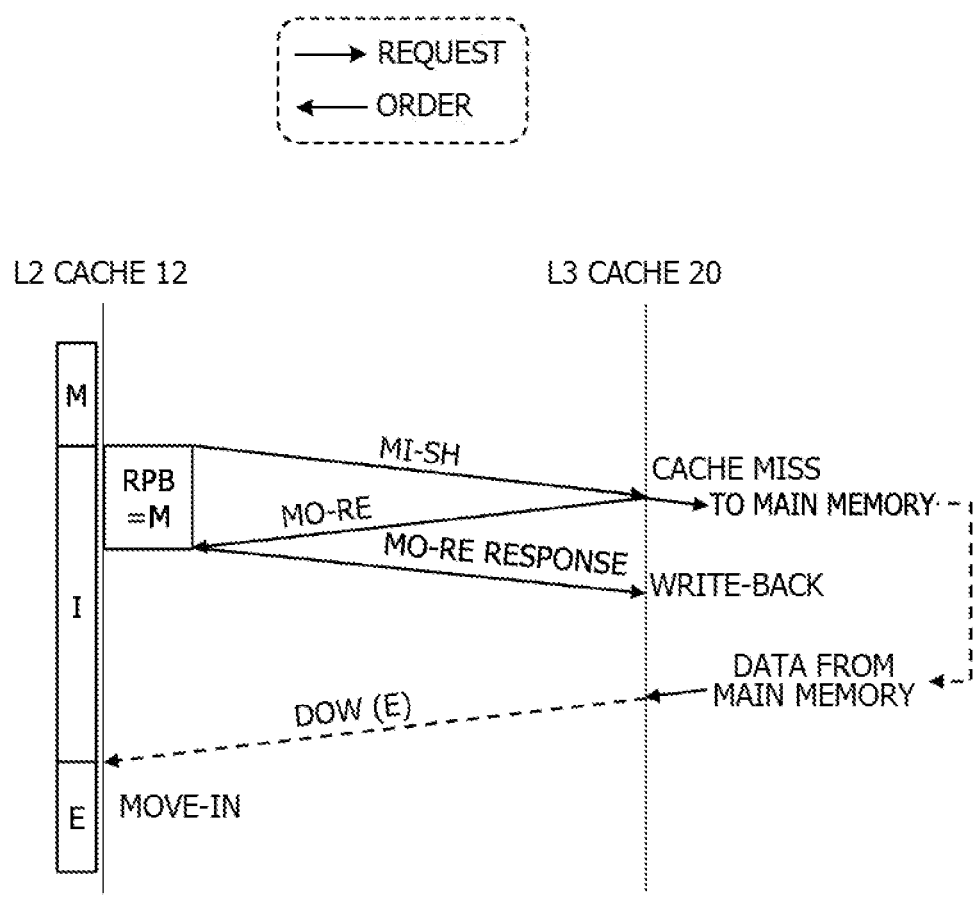
FIG. 9 is a sequence diagram illustrating an example operation of a CPU having the L3 cache illustrated in FIG. 8.

FIG. 9 illustrates an example operation of the CPU 100 including the L3 cache 20A illustrated in FIG. 8. As for the actions similar to those illustrated in FIG. 3, detailed explanation of them is not made herein. FIG. 9 illustrates an example operation in a case where the L2 cache 12 has a replacement buffer RPB. An operation to be performed by the L3 cache 20 that has received a read request MI-SH to issue a read request to the main memory after making a cache miss, and output the data received from the main memory as a response DOW(E) to the L2 cache 12 is similar to that illustrated in FIG. 3.

In a case where the read request MI-SH is issued to the L3 cache 20, the L2 cache 12 stores the eviction target Victim data (the M state) into the replacement buffer RPB, and changes the tag information in the corresponding tag region from the M state to the I state. On the basis of reception of the read request MI-SH, the L3 cache 20 searches the reference tag unit L2TAG, and issues, to the L2 cache 12, a replacement order MO-RE as an instruction to return the Victim data in the M state. At this stage, the L3 cache 20 reserves the move-out port MOP, stores the target address of the replacement order MO-RE into the entry of the resource lock unit L3OLK corresponding to the reserved MOP, and increments the resource counter L3OCNT.

On the basis of reception of the replacement order MO-RE from the L3 cache 20, the L2 cache 12 issues, to the L3 cache 20, the Victim data held in the replacement buffer RPB as a response to the replacement order MO-RE. The L3 cache 20 writes the Victim data contained in the response to the replacement order MO-RE back into the data cache unit L3DT, and changes the target region in the reference tag unit L2TAG from the V state to the I state. Also, the L3 cache 20 releases the entry of the resource lock unit L3OLK corresponding to the received response to the replacement order MO-RE, and decrements the resource counter L3OCNT.

Figure 10:
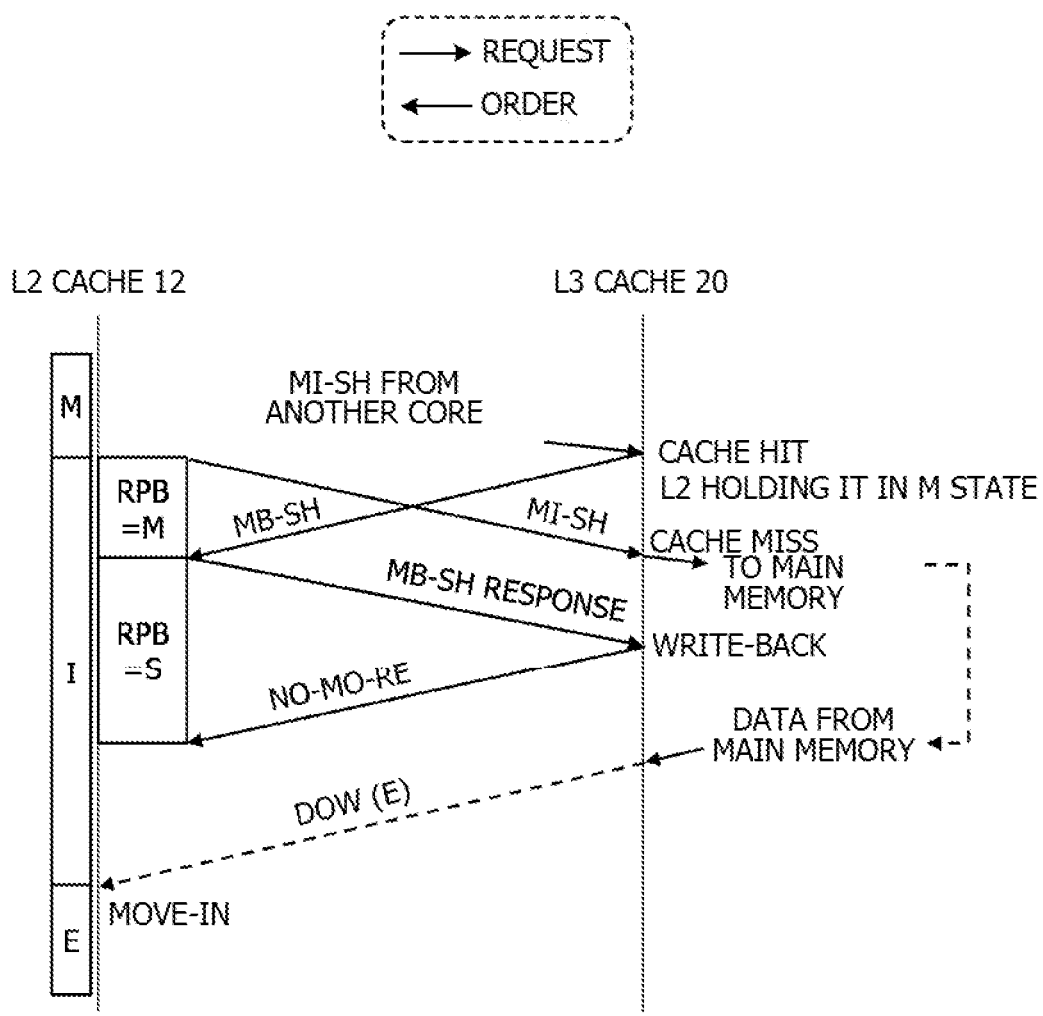
FIG. 10 is a sequence diagram illustrating another example operation of a CPU having the L3 cache illustrated in FIG. 8.

FIG. 10 illustrates another example operation of the CPU 100 including the L3 cache 20A illustrated in FIG. 8. As for the actions similar to those illustrated in FIG. 4, detailed explanation of them is not made herein. FIG. 10 illustrates an example operation in a case where the L2 cache 12 has the replacement buffer RPB. The operation to be performed by the L3 cache 20 having received a read request MI-SH from another core 10 to issue a shared order MB-SH to the L2 cache 12 is similar to that illustrated in FIG. 4. Also, an operation to be performed by the L3 cache 20 that has received the read request MI-SH to issue a read request to the main memory after making a cache miss, and output the data received from the main memory as a response DOW(E) to the L2 cache 12 is similar to that illustrated in FIG. 4.

In a case where the read request MI-SH is issued to the L3 cache 20, the L2 cache 12 stores the eviction target Victim data (the M state) into the replacement buffer RPB, and changes the tag information from the M state to the I state, as in FIG. 9. In FIG. 10, the L2 cache 12 receives a shared order MB-SH for the Victim data held in the replacement buffer RPB.

The L2 cache 12 extracts the Victim data held in the replacement buffer RPB, incorporates the extracted Victim data into the response to the shared order MB-SH, and issues the response to the L3 cache 20. The L2 cache 12 also changes the Victim data held in the replacement buffer RPB from the M state to the S state.

Through the response to the shared order MB-SH, the L3 cache 20 receives the Victim data to be received through the response to the replacement order MO-RE, and writes the received Victim data back into the data cache unit L3DT. The L3 cache 20 then issues a replacement order NO-MO-RE to the L2 cache 12, indicating that further transfer of Victim data is unnecessary. "NO" in the replacement order NO-MO-RE indicates that no data needs to be added to the response. The L2 cache 12 that has received the replacement order NO-MO-RE deletes the Victim data held in the replacement buffer RPB.

In FIGS. 9 and 10, the L2 cache 12 mounted in each core 10 includes the replacement buffer RPB. Therefore, the circuit size of the hardware becomes larger by the amount equivalent to the size of the replacement buffer, and the chip size and power consumption of the CPU 100 increase.

Figure 11:
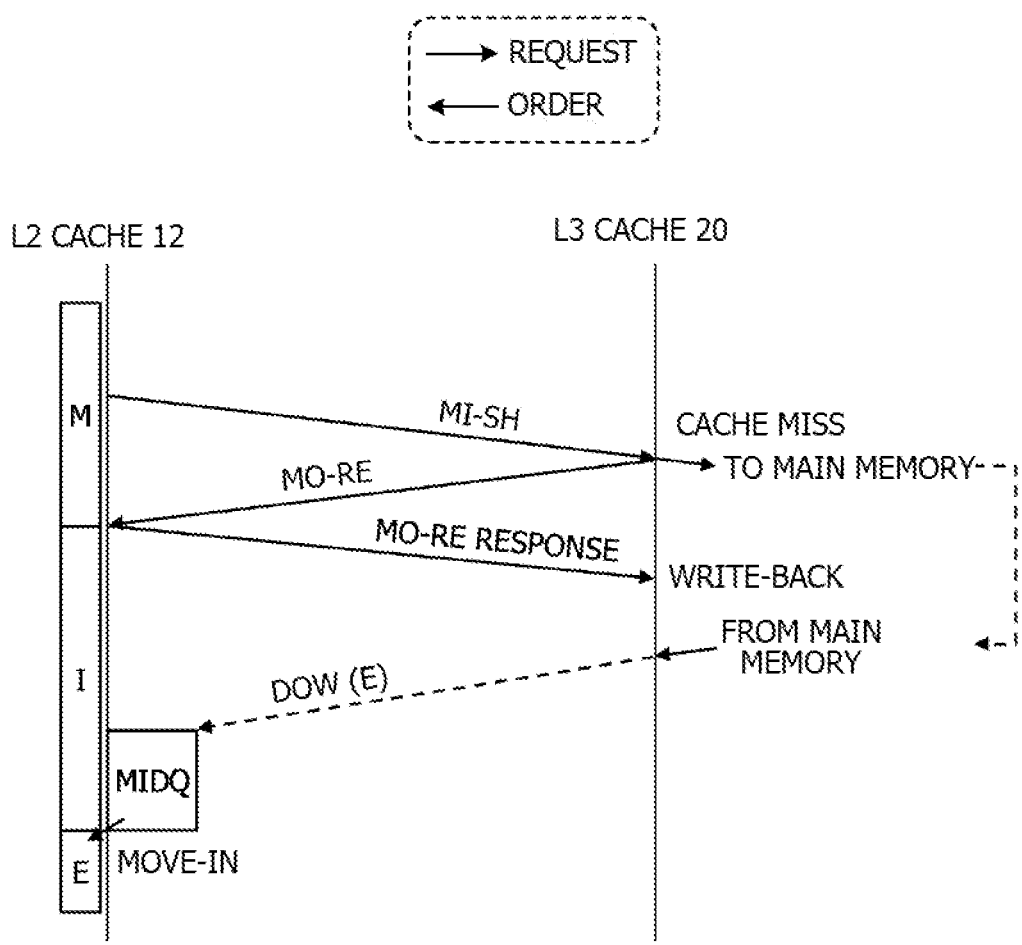
FIG. 11 is a sequence diagram illustrating yet another example operation of a CPU having the L3 cache illustrated in FIG. 8.

FIG. 11 illustrates yet another example operation of the CPU 100 including the L3 cache 20A illustrated in FIG. 8. As for the actions similar to those illustrated in FIGS. 3 and 9, detailed explanation of them is not made herein. FIG. 11 illustrates an example operation in a case where the L2 cache 12 has the move-in data buffer MIDQ. An operation to be performed by the L3 cache 20 that has received a read request MI-SH to issue a read request to the main memory after making a cache miss, and output the data received from the main memory as a response DOW(E) to the L2 cache 12 is similar to that illustrated in FIG. 3.

The L3 cache 20 that has received a read request MI-SH searches the reference tag unit L2TAG, and issues, to the L2 cache 12, a replacement order as an instruction to return Victim data in the M state. On the basis of reception of a replacement order MO-RE from the L3 cache 20, the L2 cache 12 incorporates the Victim data into the response to the replacement order MO-RE, issues the response to the L3 cache 20, and changes the tag information from the M state to the I state.

The L3 cache 20 writes the Victim data contained in the response to the replacement order MO-RE back into the data cache unit L3DT, and changes the target region in the reference tag unit L2TAG from the V state to the I state. The L3 cache 20 issues, to the L2 cache 12, the target data of the read request MI-SH received from the main memory as a response DOW(E).

The order of arrival of the replacement order MO-RE and the response DOW(E) to the read request MI-SH at the L2 cache 12 is not guaranteed. Therefore, in a case where the L2 cache 12 receives the response DOW(E) to the read request MI-SH before the replacement order MO-RE, there is a possibility that the Victim data to be evicted by the L2 cache 12 is rewritten with the data contained in the response DOW(E).

To avoid this, the L2 cache 12 temporarily stores the data contained in the response DOW(E) into the move-in data buffer MIDQ. The L2 cache 12 then holds the data contained in the response DOW(E) in the move-in data buffer MIDQ, until the Victim data is evicted as a response to the replacement order MO-RE. Note that, in this example, the replacement order MO-RE arrives before the response DOW(E). Therefore, the L2 cache 12 immediately stores the data stored in the move-in data buffer MIDQ into the L2 cache 12, and switches the corresponding cache line from the I state to the E state.

Figure 12:
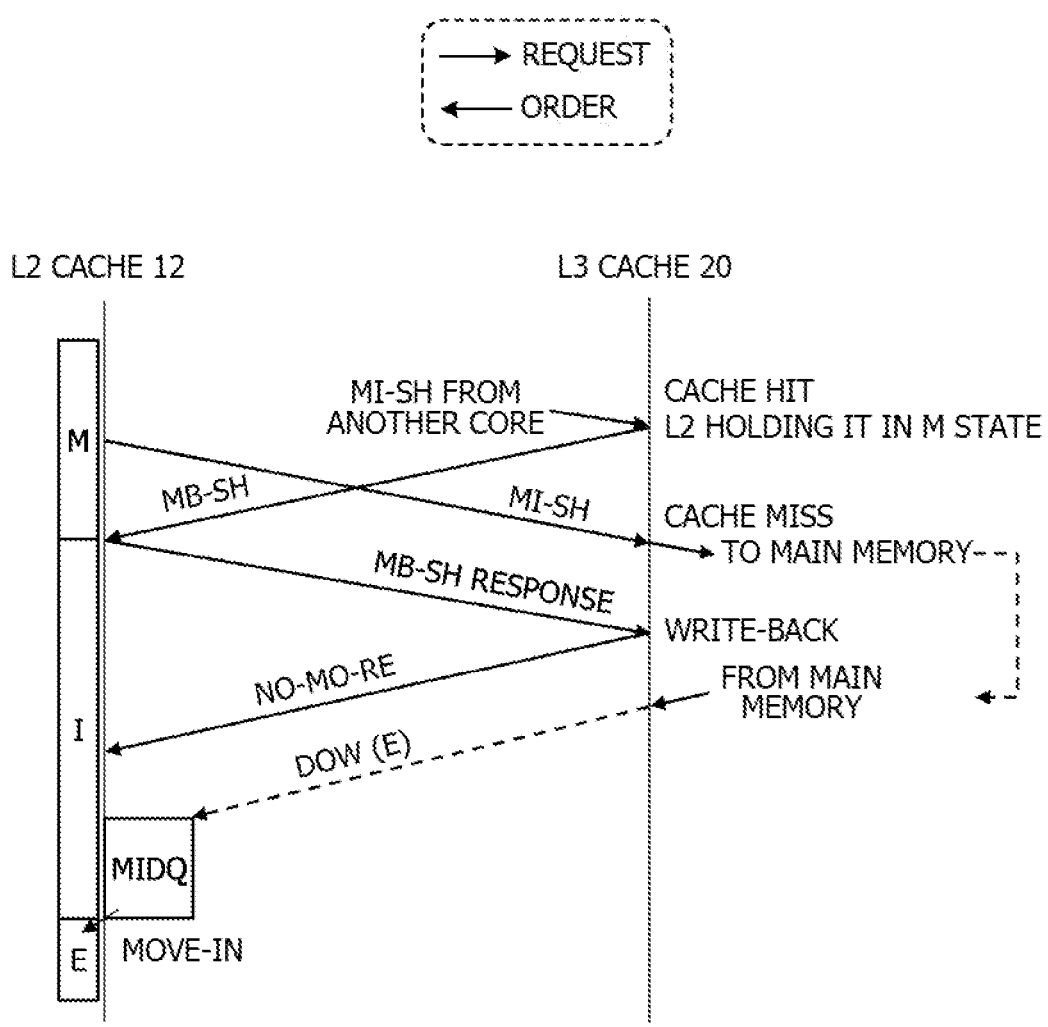
FIG. 12 is a sequence diagram illustrating another example operation of a CPU having the L3 cache illustrated in FIG. 8.

FIG. 12 illustrates another example operation of the CPU 100 including the L3 cache 20A illustrated in FIG. 8. As for the actions similar to those illustrated in FIGS. 4, 10, and 11, detailed explanation of them is not made herein. FIG. 12 illustrates an example operation in a case where the L2 cache 12 has the move-in data buffer MIDQ. The operation to be performed by the L3 cache 20 having received a read request MI-SH from another core 10 to issue a shared order MB-SH to the L2 cache 12 is similar to that illustrated in FIG. 4. An operation to be performed by the L3 cache 20 that has received a read request MI-SH to issue a read request to the main memory after making a cache miss, and output the data received from the main memory as a response DOW(E) to the L2 cache 12 is similar to that illustrated in FIG. 4. Further, an operation to store the data contained in the response DOW(E) into the L2 cache 12 via the move-in data buffer MIDQ is similar to that illustrated in FIG. 11.

Before receiving a read request MI-SH from the L2 cache 12, the L3 cache 20 receives a read request MI-SH from the L2 cache 12 of another core 10, and determines a cache hit, as in FIG. 4. Because the L2 cache 12 holds the target data of the read request MI-SH from the another core 10 in the state M, the L3 cache 20 issues a shared order MB-SH to the L2 cache 12.

The L2 cache 12 that has received the shared order MB-SH issues, to the L3 cache 20, the target data (also serving as Victim data) of the shared order MB-SH as the response to the shared order MB-SH. The L2 cache 12 also changes the state of the cache line holding the responding data from the M state to the I state.

The L3 cache 20 stores (writes back) the data contained in the response to the shared order MB-SH, into the data cache unit L3DT. Receiving the Victim data as the response to the shared order MB-SH, the L3 cache 20 issues a replacement order NO-MO-RE indicating that transfer of the Victim data is unnecessary, to the L2 cache 12, as in FIG. 10. On the basis of the replacement order NO-MO-RE, the L2 cache 12 determines that the Victim data has already been returned. The operation after that is similar to the operation illustrated in FIG. 11.

In FIGS. 11 and 12, while the resource for the replacement buffer RPB can be reduced, a new data buffer resource such as the move-in data buffer MIDQ is prepared. Therefore, the resources in the entire cache system are not reduced. Further, in FIGS. 11 and 12, if the arrival of the replacement order MO-RE at the L2 cache 12 is delayed, the time during which various resources such as the move-in data buffer MIDQ are occupied also becomes longer. Therefore, to maintain high throughput, more entries of the move-in data buffer MIDQ are preferably secured, resulting in an increase in the circuit size.

As described above, in the embodiment illustrated in FIGS. 1 to 7, in a case where the L3 cache 20 receives a read request MI-SH having the same target address as a write-back request WRBK before the write-back request WRBK, the L3 cache 20 aborts the read request MI-SH. Further, in a case where the reference tag unit L2TAG receives a response NO-MB-SH(CRS) in the V state, the L3 cache 20 continues to abort the response NO-MB-SH(CRS) until the reference tag unit L2TAG is switched to the I state by the write-back request WRBK.

As a result, erroneous data before being written back can be stopped from being sent as a response on the basis of the read request MI-SH. Also, erroneous data before being written back can be stopped from being transferred to another core 10 on the basis of the response NO-MB-SH (CRS). At this stage, on the basis of the cross flag CRS added to the response NO-MB-SH(CRS), the pipeline L3P can detect that the data to be returned in response to the shared order MB-SH has already been returned.

As a result, it is possible to guarantee the order relation between accesses generated during the replacement process, without providing the replacement buffer RPB or the move-in data buffer MIDQ in the L2 cache 12. That is, malfunctions of the CPU 100 and the cache system can be reduced, and data coherency can be maintained.

Since the L2 caches 12 exist for the respective cores 10, the effect of a decrease in the chip size of the CPU 100 by deleting the replacement buffer RPB or the move-in data buffer MIDQ is great. Thus, the replacement process can be performed without any malfunctioning, and data coherency can be maintained, even though any data buffer resource such as the replacement buffer RPB or the move-in data buffer MIDQ is not provided.

The L3 caches 20 each have a write-back port WBP that receives a write-back request WRBK, separately from a move-in port MIP that receives a read request MI-SH and the like. Because of this, the write-back request WRBK can be input to the pipeline L3P, regardless of the processing of the read request MI-SH, and the conflict between the read request MI-SH and the write-back request WRBK can be reduced. As a result, the write-back request WRBK or the flashback request FLBK can be stopped from being made to wait by another request such as the read request MI-SH, and deadlock of the pipeline L3P can be reduced. Thus, it is possible to reduce the decrease in the processing performance of the cache system.

Following the issuance of the read request MI-SH, the write-back request WRBK is issued, but the replacement order MO-RE from the L3 cache 20 is not awaited, so that the Victim data can be promptly evicted from the L2 cache 12. As a result, the replacement order MO-RE to be issued from the L3 cache 20 can be made unnecessary during the replacement process, and the replacement process can be simplified accordingly.

Figure 13:
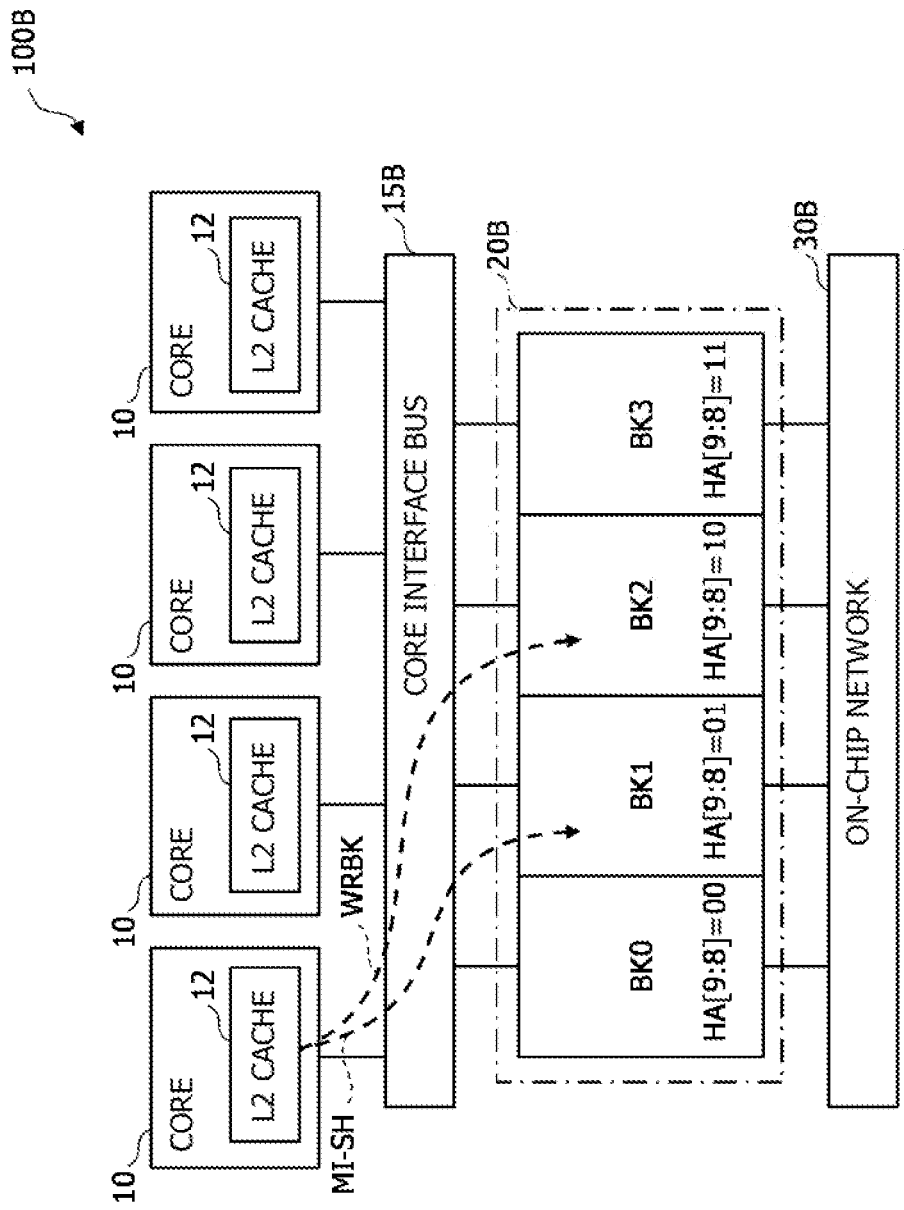
FIG. 13 is a block diagram illustrating an overview of a CPU according to another embodiment.

FIG. 13 illustrates an overview of a CPU in another embodiment. A CPU 100B illustrated in FIG. 13 includes an L3 cache 20B and an on-chip network 30B, instead of the L3 caches 20 and the on-chip network 30 illustrated in FIG. 1. The CPU 100B also includes a core interface bus 15B between the cores 10 and the L3 cache 20B. The other components of the CPU 100B are similar to the components of the CPU 100 illustrated in FIG. 1.

In this embodiment, the L3 cache 20B includes four L3 banks BK (BK0 to BK3) identified by hash addresses HA[9:8]. The L3 banks BK0 to BK3 each have the configuration of the L3 cache 20 illustrated in FIG. 2, and operate independently of one another. Note that the number of L3 banks BK is not limited to four, and may be two or eight.

For example, the L2 cache 12 of each core 10 inputs an address to a hash function, to determine the L3 bank BK to which a read request MI-SH is to be issued at a time of a cache miss. The L2 cache 12 then issues the read request MI-SH to the determined L3 bank BK. Further, the L2 cache 12 of each core 10 determines the L3 bank BK to which the address of a write-back request WRBK is assigned, using a hash function. The L2 cache 12 then issues the write-back request WRBK to the determined L3 bank BK.

In this manner, the L3 banks BK that issue the read request MI-SH and the write-back request WRBK can be dispersed, in accordance with the hash addresses HA[9:8]. As a result, bank conflicts in which accesses are concentrated on a specific L3 bank BK can be reduced.

In this embodiment, the respective bits of a hash address HA[9:8] are calculated as the exclusive OR of physical addresses PA[9:8], PA[11:10], and PA[13:12]. That is, the hash function is the exclusive OR of the physical addresses PA[9:8], PA[11:10], and PA[13:12]. A sign "^" in the drawing indicates an exclusive OR. Note that the hash addresses HA[9:8] may be calculated with some other hash function, and the bit position to which a hash address HA is assigned is not limited to [9:8].

The core interface bus 15B selects an L3 bank BK in accordance with the hash address HA[9:8] contained in a request output by an L2 cache 12, and outputs the request to the selected L3 bank BK. The core interface bus 15B also selects an L2 cache 12 in accordance with the address included in an order output by an L3 bank BK, and outputs the order to the selected L2 cache 12. Note that the hash addresses HA may be calculated by the core interface bus 15B.

Meanwhile, in the L3 cache 20A illustrated in FIG. 8, the L3 cache 20 that has received the read request MI-SH issues a replacement order MO-RE as illustrated in FIGS. 9 to 12. That is, the L3 bank BK that receives the read request MI-SH and the L3 bank BK that issues the replacement order MO-RE are the same. In other words, the L3 bank BK that receives the read request MI-SH and the L3 bank BK that manages the address of the Victim cache line need to match. Therefore, the CPU 100 that performs the operations illustrated in FIGS. 9 to 12 is unable to adopt the hash address method, and it is difficult for the CPU 100 to reduce bank conflicts.

Operations of the CPU 100B illustrated in FIG. 13 are similar to the operations illustrated in FIGS. 3 to 6, except that the L3 cache 20 is replaced with the L3 banks BK, and the L3 banks BK to which the read request MI-SH and the write-back request WRBK are to be issued are different. Note that, in an operation of the CPU 100B illustrated in FIG. 13, the L3 bank BK that issues the shared order MB-SH in FIGS. 4 and 5 is the same as the L3 bank BK that receives the write-back request WRBK.

Figure 14:
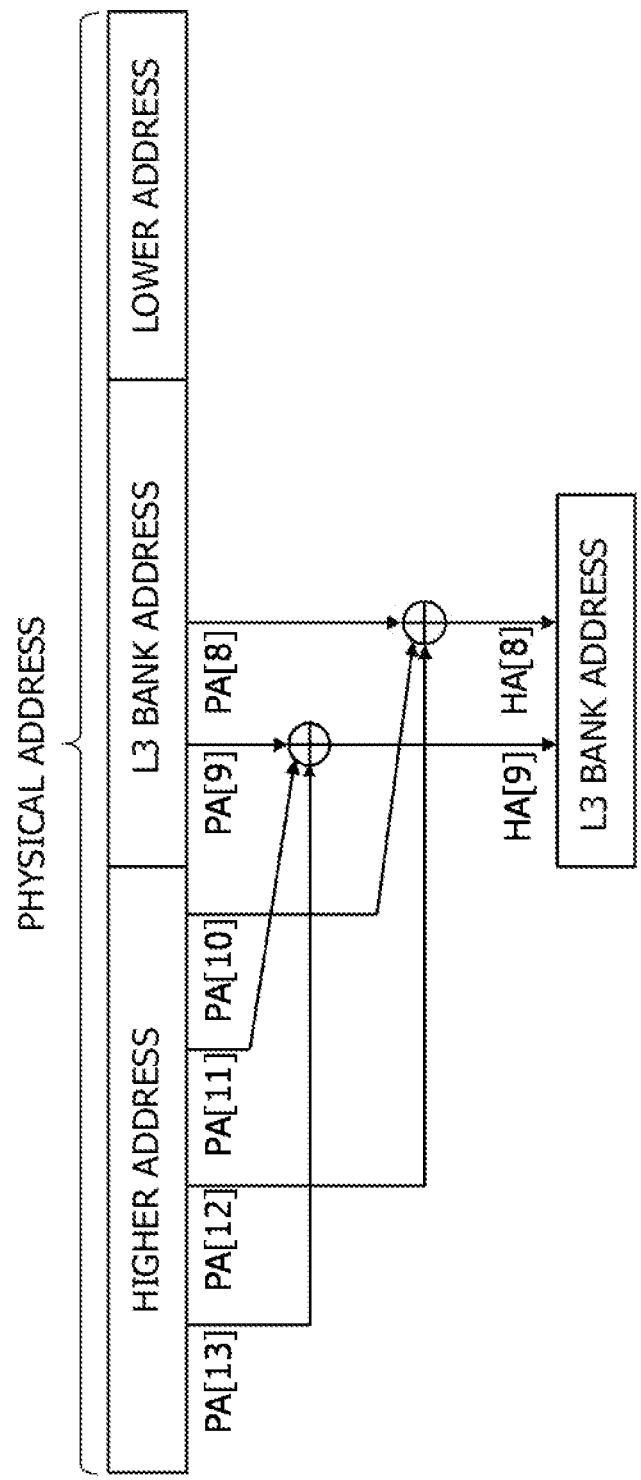
FIG. 14 is a diagram for explaining an example in which the L3 cache in FIG. 13 generates a hash address for selecting an L3 bank.

FIG. 14 illustrates an example in which the L3 cache 20B in FIG. 13 generates a hash address HA[9:8] for selecting an L3 bank BK. A hash address HA[9] is generated as the exclusive OR of physical addresses PA[13], PA[11], and PA[9]. A hash address HA[8] is generated as the exclusive OR of physical addresses PA[12], PA[10], and PA[8]. A physical address PA[9:8] is the address originally assigned to an L3 bank BK.

As described above, in the embodiment illustrated in FIGS. 13 and 14, effects similar to those of the embodiment illustrated in FIGS. 1 to 7 can be achieved. Further, in the embodiment illustrated in FIGS. 13 and 14, the L3 banks BK that issue the read request MI-SH and the write-back request WRBK can be dispersed, in accordance with the hash addresses HA[9:8]. As a result, in the cache system in which the higher caches issue write-back requests WRBK, the lower L3 banks BK to which requests are to be issued can be dispersed, and the occurrence of bank conflicts can be reduced.

Figure 15:
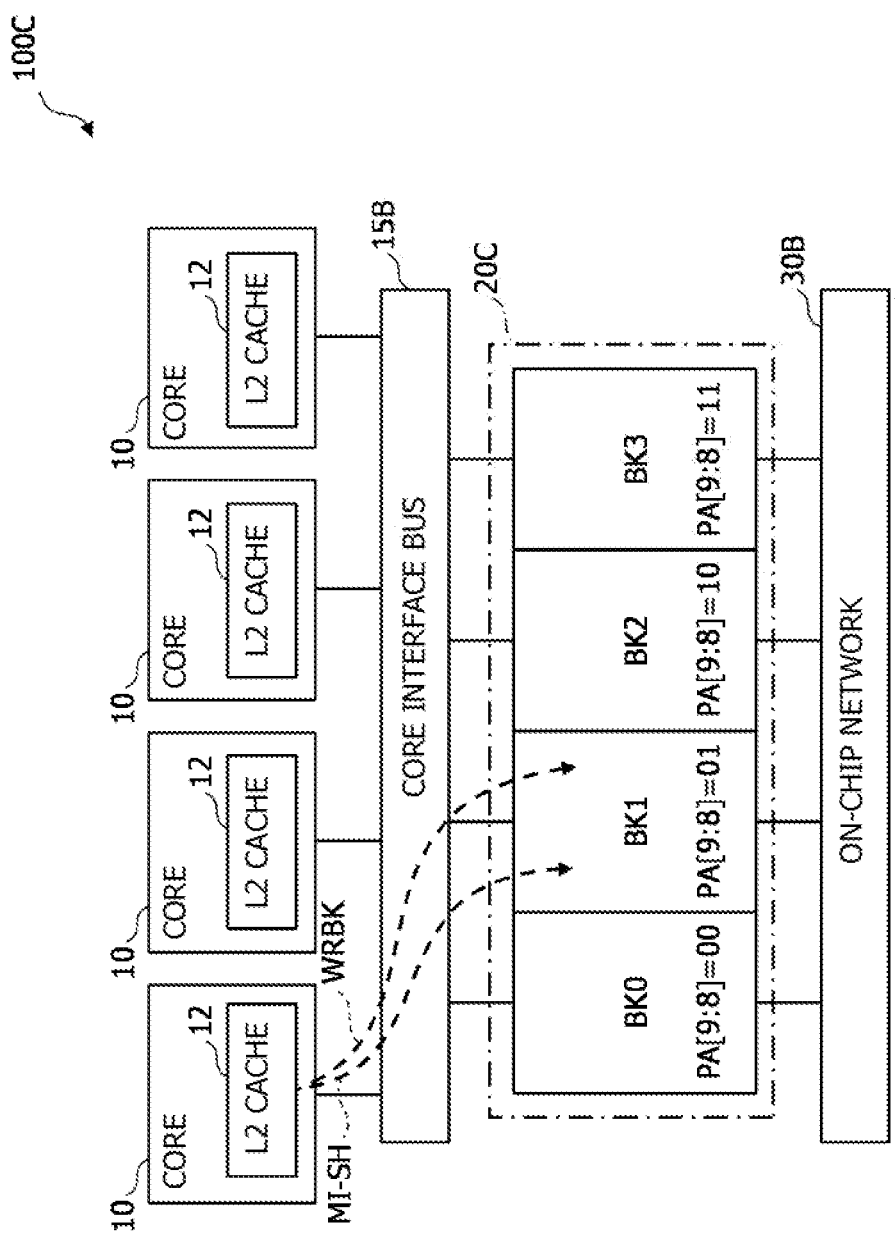
FIG. 15 is a block diagram illustrating an overview of a CPU according to another embodiment.

FIG. 15 illustrates an overview of a CPU in another embodiment. Components similar to those in FIG. 13 are denoted by the same reference numerals as those used in FIG. 13, and detailed explanation of them is not repeated herein. A CPU 100C illustrated in FIG. 15 includes an L3 cache 20C and an on-chip network 30B, instead of the L3 caches 20 and the on-chip network 30 illustrated in FIG. 1. The CPU 100B also includes a core interface bus 15B between the cores 10 and the L3 cache 20B. The other components of the CPU 100C are similar to the components of the CPU 100 illustrated in FIG. 1.

In this embodiment, the L3 cache 20C includes four L3 banks BK (BK0 to BK3) identified by physical addresses PA[9:8]. The L3 banks BK0 to BK3 each have the configuration illustrated in FIG. 2, and operate independently of one another. In a case where a read request from a core 10 makes a cache miss, the L2 cache 12 issues a read request MI-SH to the L3 bank BK to which the target address is assigned. After that, the L2 cache 12 issues the write-back request WRBK to the L3 bank BK that issued the read request MI-SH. Operations of the CPU 100C illustrated in FIG. 15 are similar to the operations illustrated in FIGS. 3 to 6, except that the L3 cache 20 is replaced with the L3 banks BK.

As described above, in the embodiment illustrated in FIG. 15, effects similar to those of the embodiment illustrated in FIGS. 1 to 7 can be achieved. For example, in a case where there is a plurality of L3 banks BK identified by physical addresses PA, the order relation between accesses that occur during the replacement process can also be guaranteed without a data buffer resource, and data coherency can also be maintained.

From the above detailed description, characteristics and advantages of the embodiments will become apparent. This is intended to cover the features and advantages of the embodiments described above without departing from the spirit and the scope of the claims. Furthermore, any person having ordinary knowledge in the technical field can be easily come up with various improvements and modifications. Therefore, there is no intention to limit the scope of the inventive embodiments to those described above, and the scope of the inventive embodiments can rely on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device comprising:
a core which includes a first cache and a second cache; and
a third cache configured to connect to the core, wherein the core is configured to:
hold a read instruction that is issued from the first cache to the second cache,
hold a write-back instruction that is issued from the first cache to the second cache,
process the read instruction and the write-back instruction,
determine whether a target address of the read instruction is held by the first cache by using a cache tag that indicates a state of the first cache, and
when data of the target address is held by the first cache, abort the read instruction until it is determined that data of the target address is not held by the first cache.

2. The semiconductor device according to claim 1, wherein the core is configured to:
process the write-back instruction, to overwrite a third cache with the data of the target address evicted from the first cache, and
process the read instruction, after updating the cache tag to indicate that the first cache does not hold the data of the target address.

3. The semiconductor device according to claim 1, wherein
the second cache is configured to:
receive, from the first cache, a snoop response to an eviction instruction issued to the first cache, and
when the snoop response indicates that eviction target data is not included and when the cache tag indicates that the eviction target data is held, abort the snoop response until the cache tag indicates that the first cache does not hold the eviction target data.

4. The semiconductor device according to claim 3, wherein
the second cache is configured to:
process the write-back instruction, to update the cache tag to indicate that the first cache does not hold the eviction target data evicted from the first cache, and
process the snoop response by using the eviction target data after updating the cache tag.

5. The semiconductor device according to claim 1, wherein
the first cache is configured to:
issue the read instruction to the second cache, when a load instruction makes a cache miss, and
issue the write-back instruction including eviction data to the second cache, to secure a region that stores data contained in a response to the read instruction.

6. The semiconductor device according to claim 1, wherein
the lower cache has a plurality of banks including a plurality of cache blocks that hold data, and
addresses of the plurality of cache blocks are dispersed and allocated across the plurality of banks.

7. The semiconductor device according to claim 6, wherein
the addresses allocated to the plurality of cache blocks is hash addresses obtained by inputting a physical address into a hash function.

8. A semiconductor device comprising:
a calculation unit that executes an instruction;
a higher cache connected to the calculation unit; and
a lower cache connected to the higher cache,
wherein the lower cache includes:
a first port that holds a read instruction received from the higher cache,
a second port that holds a write-back instruction received from the higher cache,
a processing unit that processes the read instruction input from the first port and the write-back instruction input from the second port,
a cache unit that holds data, and
a higher cache tag that indicates a state of the higher cache,
wherein the processing unit aborts the read instruction input from the first port, until the higher cache tag indicates that the higher cache does not hold the data of the target address, when the higher cache tag indicates that the higher cache holds data of a target address of the read instruction input from the first port.

* * * * *